(12) United States Patent
Katano et al.

(10) Patent No.: US 8,443,117 B2
(45) Date of Patent: May 14, 2013

(54) CONNECTION EXPANSION DEVICE, STORAGE SYSTEM, CONNECTION EXPANSION CONTROL PROGRAM, AND CONNECTION EXPANSION CONTROL METHOD

(75) Inventors: Atsushi Katano, Kawasaki (JP);
Atsuhiro Otaka, Kawasaki (JP);
Nobuyuki Honjo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/107,414

(22) Filed: May 13, 2011

(65) Prior Publication Data
US 2011/0289240 A1 Nov. 24, 2011

(30) Foreign Application Priority Data

May 19, 2010 (JP) ................................ 2010-115749

(51) Int. Cl.
*G06F 3/00* (2006.01)
(52) U.S. Cl.
USPC ................... 710/19; 710/16; 710/20; 710/21; 710/38; 710/305; 710/306; 710/312; 710/316; 710/317; 370/217; 370/225; 711/114; 714/2; 714/3; 714/4.2; 714/25; 714/43
(58) Field of Classification Search .................. None
See application file for complete search history.

(56) References Cited

U.S. PATENT DOCUMENTS

| | | | | |
|---|---|---|---|---|
| 5,649,108 A | * | 7/1997 | Spiegel et al. ................. | 709/241 |
| 7,035,952 B2 | * | 4/2006 | Elliott et al. ................... | 710/300 |
| 7,853,821 B2 | * | 12/2010 | Knapstad et al. ............ | 714/5.11 |
| 7,904,744 B2 | | 3/2011 | Oikawa et al. | |
| 8,014,319 B2 | * | 9/2011 | Hei et al. ....................... | 370/255 |
| 8,051,334 B2 | * | 11/2011 | Jones et al. ..................... | 714/43 |
| 2005/0066100 A1 | * | 3/2005 | Elliott et al. .................... | 710/300 |
| 2006/0101171 A1 | * | 5/2006 | Grieff et al. ..................... | 710/36 |
| 2006/0136688 A1 | * | 6/2006 | Pang et al. ..................... | 711/162 |
| 2007/0070885 A1 | * | 3/2007 | Uddenberg et al. ........... | 370/225 |
| 2008/0126698 A1 | * | 5/2008 | Honda .......................... | 711/114 |
| 2008/0155133 A1 | * | 6/2008 | Honjo et al. .................... | 710/19 |
| 2008/0244098 A1 | * | 10/2008 | Oikawa et al. .................... | 710/5 |
| 2009/0003367 A1 | * | 1/2009 | Hei et al. ....................... | 370/408 |
| 2009/0125655 A1 | * | 5/2009 | Jones et al. ................... | 710/104 |
| 2011/0107002 A1 | * | 5/2011 | Jones et al. ................... | 710/312 |

FOREIGN PATENT DOCUMENTS

JP 2008-242872 A 10/2008

OTHER PUBLICATIONS

'Serial Attached SCSI (SAS) Interface Manual' by Seagate Technology LLC, May 2006.*
'Working Draft American National Standard—Project T10/1601-D, Information Technology—Serial Attached SCSI—1.1 (SAS—1.1)' Revision 4, by T10, Mar. 13, 2004.*

* cited by examiner

*Primary Examiner* — Steven Snyder
(74) *Attorney, Agent, or Firm* — Fujitsu Patent Center

(57) ABSTRACT

A connection expansion device connected to devices includes a plurality of ports to which devices are connected, a storage unit configured to record device information obtained from each port, and a processing unit configured to specify, based on the device information, a port in which an abnormal device exists, invalidate device information belonging to the port, and cause the storage unit to hold device information of a normal device.

3 Claims, 30 Drawing Sheets

FIG. 10

| ROUTING TABLE 224 | | | | | |
|---|---|---|---|---|---|
| | Phy 0 | Phy 1 | ... | Phy M-1 | }-426 |
| INDEX 1 | DEVICE | | | | |
| INDEX 2 | | | | | |
| ⋮ | | | | | |
| INDEX N | | | | | |

ROUTING TABLE 224 IN EXP 00 (AT TIME OF NORMALLY FUNCTIONING OPERATION)

| | Phy 0 | Phy 1 | Phy 2 | Phy 3 | Phy 4 | ... | Phy M-1 |
|---|---|---|---|---|---|---|---|
| INDEX 1 | DEVICE 101 | DEVICE 111 | DEVICE 121 | DEVICE 131 | 0 | ... | 0 |
| INDEX 2 | DEVICE 102 | DEVICE 112 | DEVICE 122 | DEVICE 132 | 0 | ... | 0 |
| ... | ... | ... | ... | ... | ... | ... | ... |
| INDEX F | DEVICE 10F | DEVICE 11F | DEVICE 12F | DEVICE 13F | 0 | ... | 0 |
| INDEX F+1 | 0 | 0 | 0 | 0 | 0 | ... | 0 |
| ... | ... | ... | ... | ... | ... | ... | ... |
| INDEX N | 0 | 0 | 0 | 0 | 0 | ... | 0 |

FIG. 13

ROUTING TABLE 224 IN EXP 00 (AFTER phy 3 IS DISCARDED)

| | Phy 0 | Phy 1 | Phy 2 | Phy 3 | Phy 4 | ... | Phy M-1 |
|---|---|---|---|---|---|---|---|
| INDEX 1 | DEVICE 101 | DEVICE 111 | DEVICE 121 | 0 | 0 | ... | 0 |
| INDEX 2 | DEVICE 102 | DEVICE 112 | DEVICE 122 | 0 | 0 | ... | 0 |
| ... | ... | ... | ... | ... | ... | ... | ... |
| INDEX F | DEVICE 10F | DEVICE 11F | DEVICE 12F | 0 | 0 | ... | 0 |
| INDEX F+1 | 0 | 0 | 0 | 0 | 0 | ... | 0 |
| ... | ... | ... | ... | ... | ... | ... | ... |
| INDEX N | 0 | 0 | 0 | 0 | 0 | ... | 0 |

FIG. 14

ROUTING TABLE 224 IN EXP 00 (AFTER phy 3 DISCOVERY IS COMPLETED)

| | Phy 0 | Phy 1 | Phy 2 | Phy 3 | Phy 4 | ... | Phy M-1 |
|---|---|---|---|---|---|---|---|
| INDEX 1 | DEVICE 101 | DEVICE 111 | DEVICE 121 | DEVICE 131 | 0 | ... | 0 |
| INDEX 2 | DEVICE 102 | DEVICE 112 | DEVICE 122 | DEVICE 132 | 0 | ... | 0 |
| ... | ... | ... | ... | ... | ... | ... | ... |
| INDEX F | DEVICE 10F | DEVICE 11F | DEVICE 12F | 0 | 0 | ... | 0 |
| INDEX F+1 | 0 | 0 | 0 | 0 | 0 | ... | 0 |
| ... | ... | ... | ... | ... | ... | ... | ... |
| INDEX N | 0 | 0 | 0 | 0 | 0 | ... | 0 |

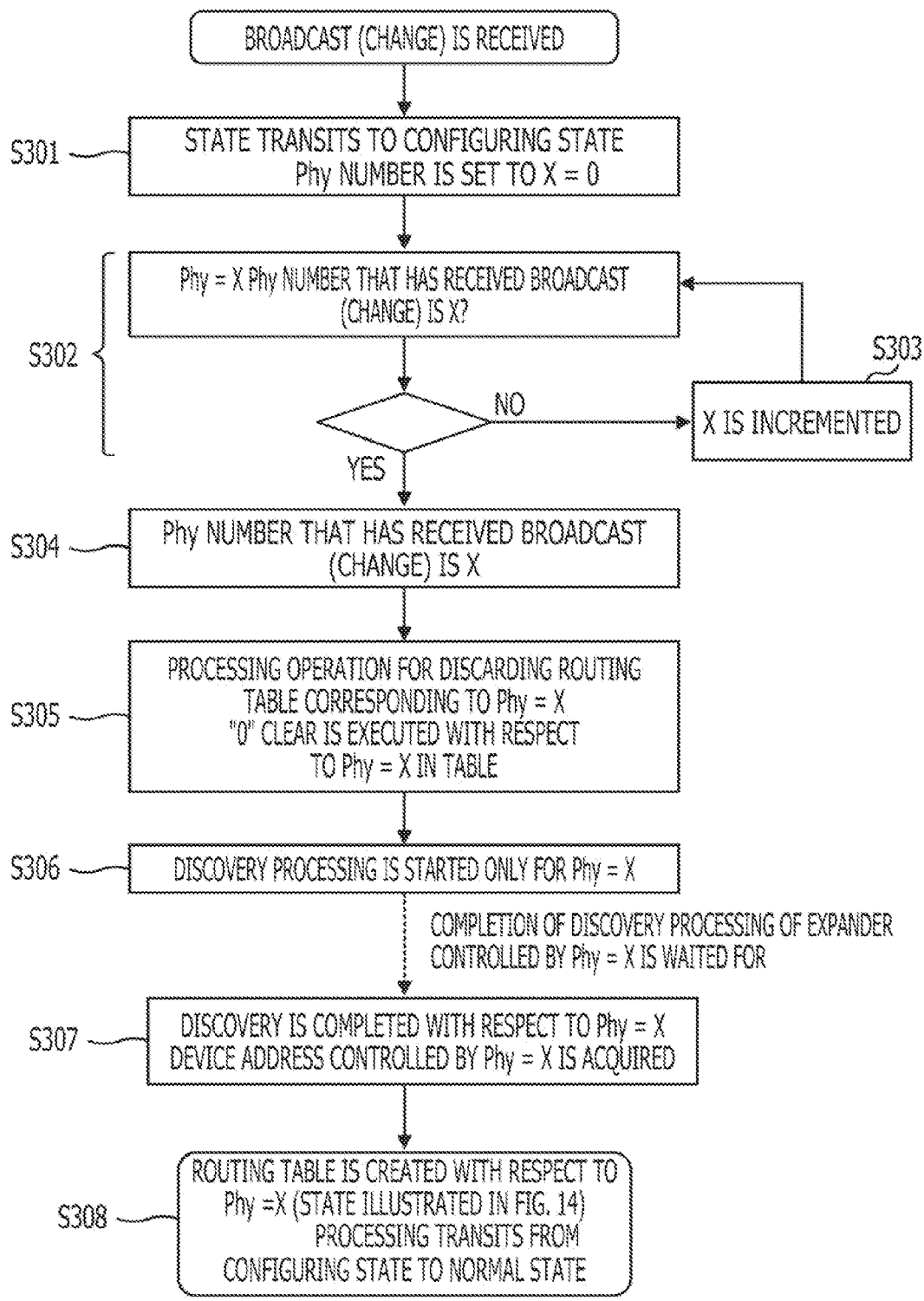

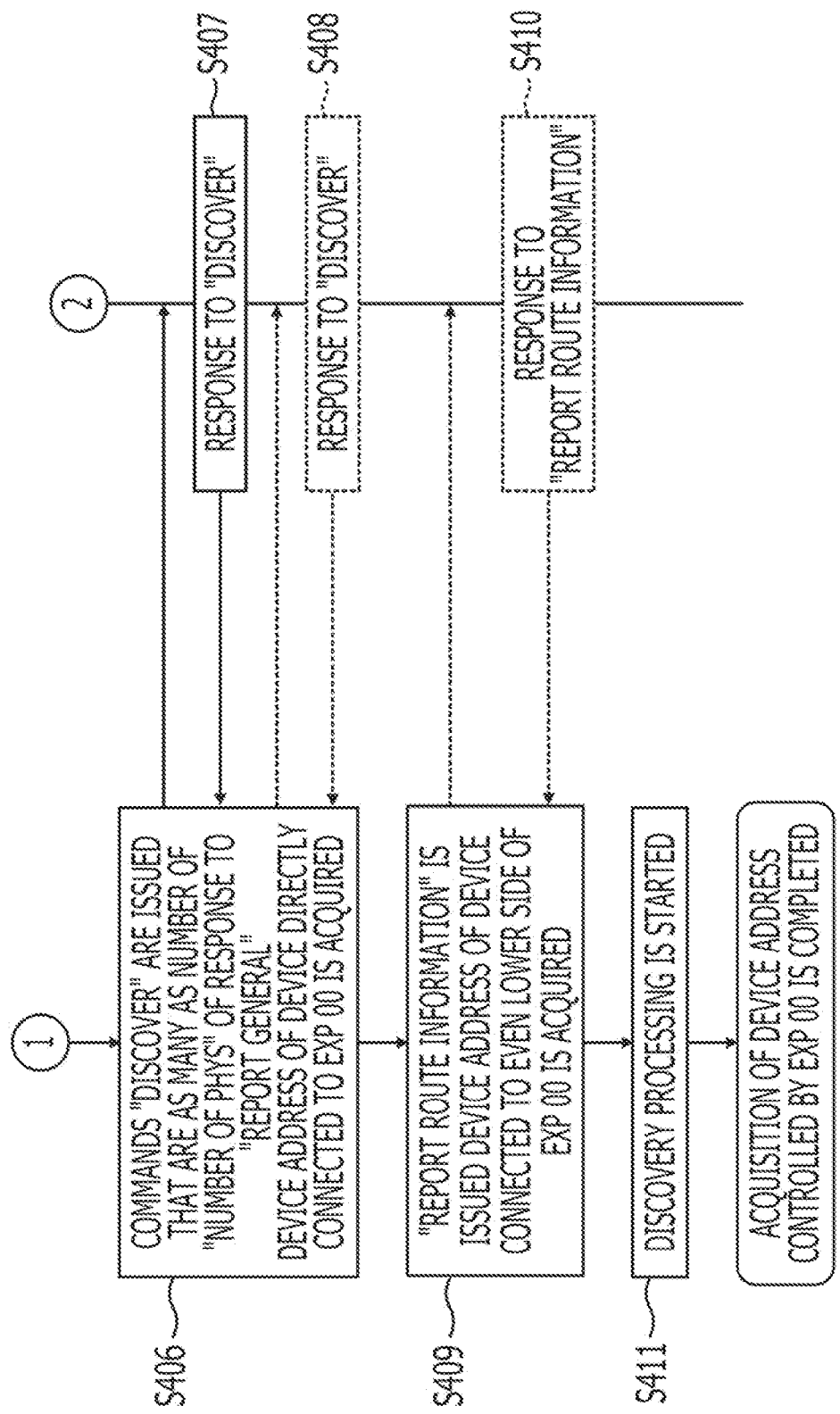

FIG. 19

DEVICE MAP 422

| | SAS ADDRESS |
|---|---|
| INDEX 1 | DEVICE101 |
| INDEX 2 | DEVICE102 |
| ⋮ | ⋮ |
| INDEX 45 | DEVICE12F |
| INDEX 46 | 0 |
| ⋮ | ⋮ |
| INDEX N | 0 |

DEVICE MAP 422

| | SAS ADDRESS |
|---|---|
| INDEX 1 | DEVICE101 |
| INDEX 2 | DEVICE102 |
| ⋮ | ⋮ |
| INDEX 45 | DEVICE12F |
| INDEX 46 | DEVICE131 |
| ⋮ | ⋮ |
| INDEX 59 | DEVICE13E |
| INDEX 60 | 0 |
| ⋮ | ⋮ |
| INDEX N | 0 |

| | INDEX 1 | ... | INDEX F |
|---|---|---|---|
| Phy 1 | SAS ADDRESS OF DEVICE 101 | ... | SAS ADDRESS OF DEVICE 10F |
| Phy 2 | SAS ADDRESS OF DEVICE 111 | ... | SAS ADDRESS OF DEVICE 11F |
| Phy 3 | SAS ADDRESS OF DEVICE 121 | ... | SAS ADDRESS OF DEVICE 12F |
| Phy 4 | SAS ADDRESS OF DEVICE 131 | ... | SAS ADDRESS OF DEVICE 13F |

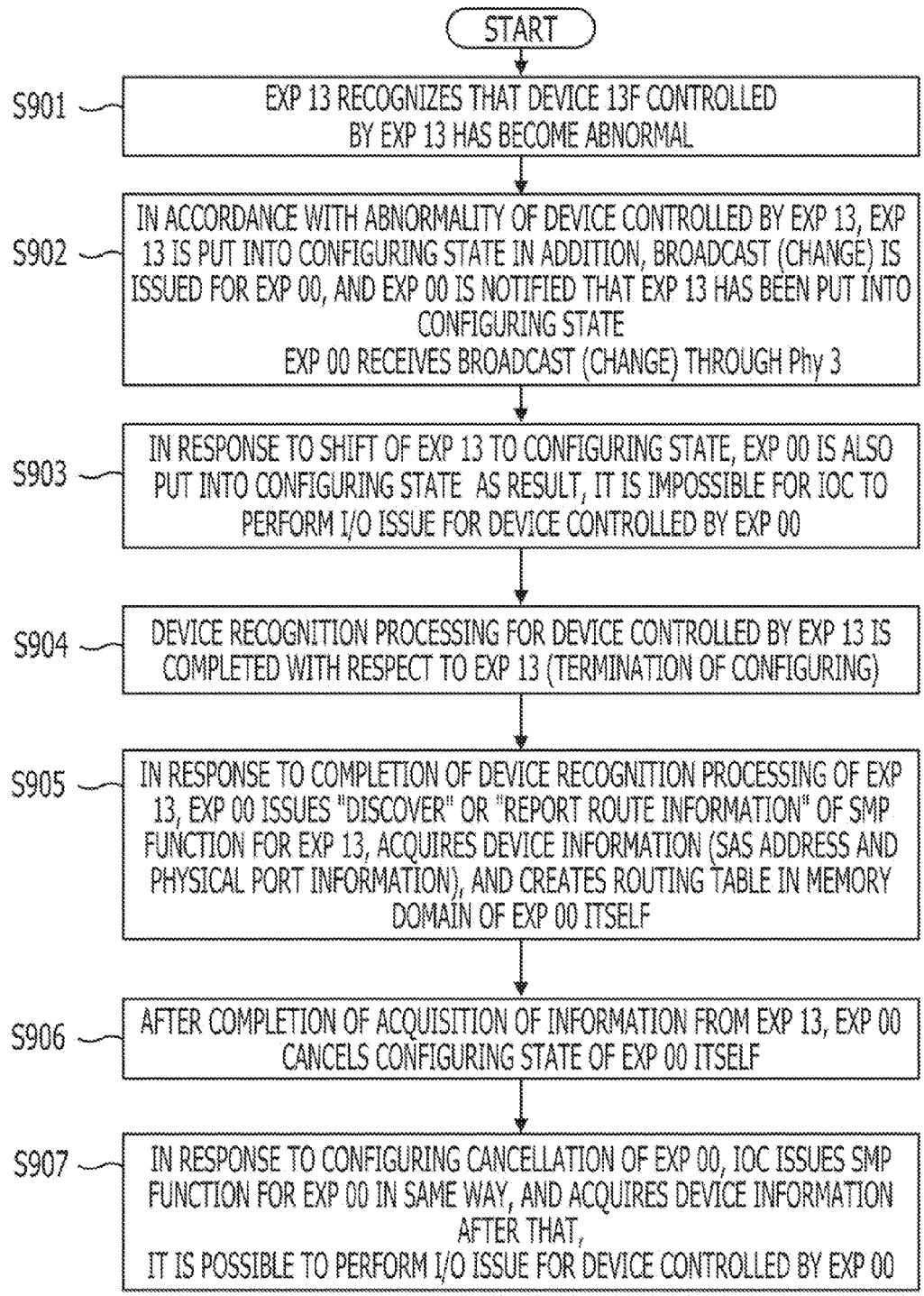

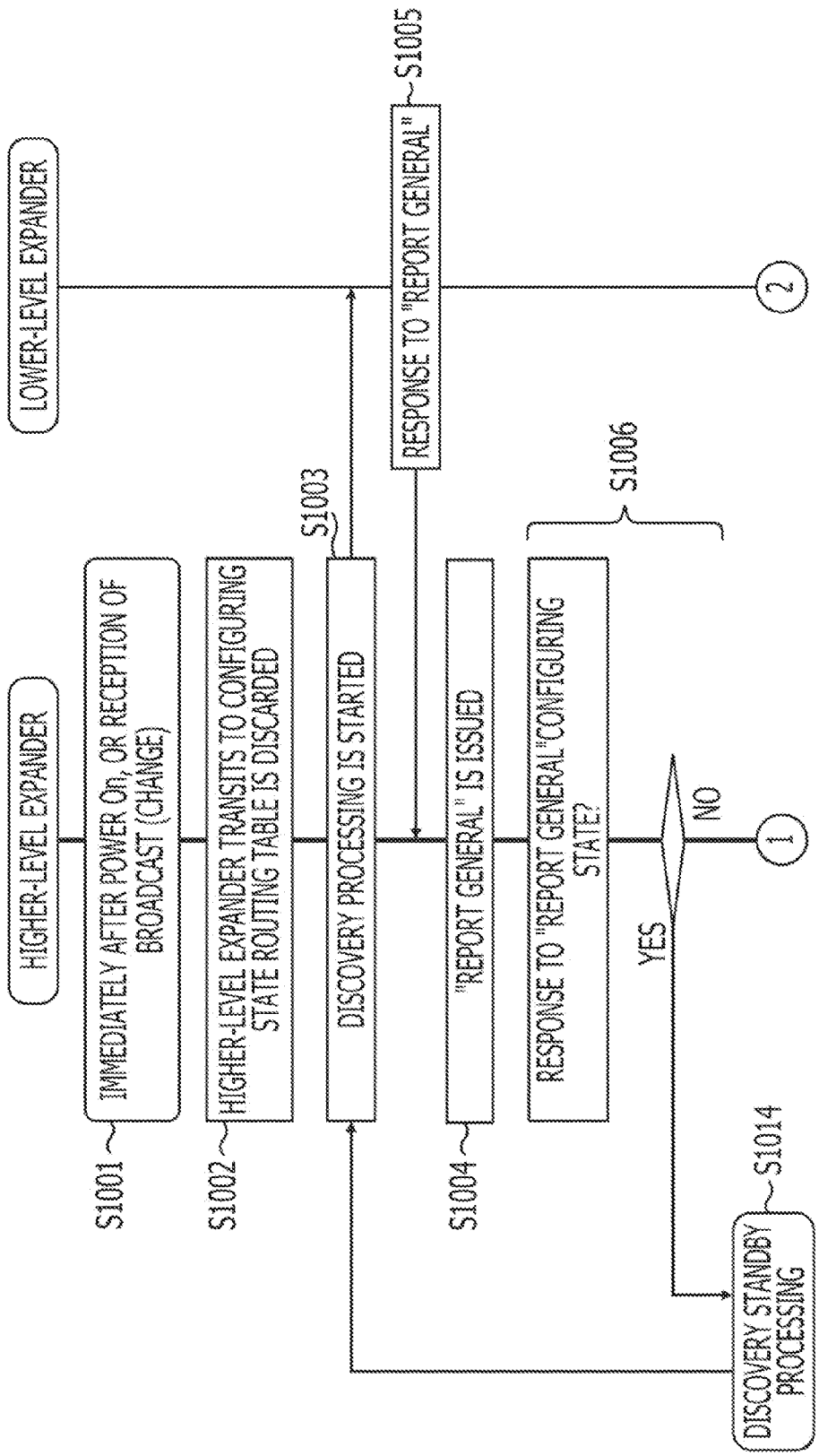

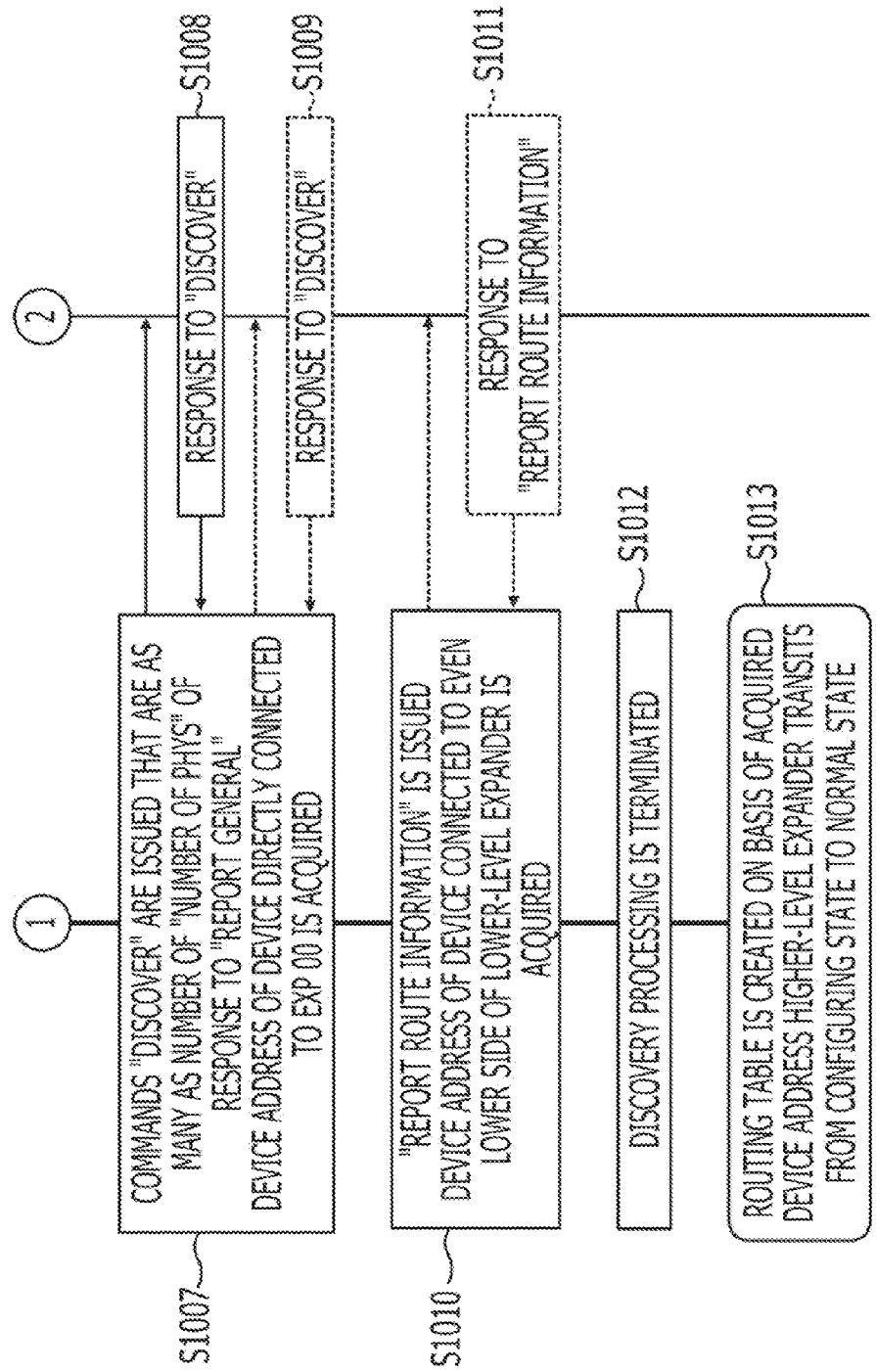

CONNECTION EXPANSION DEVICE, STORAGE SYSTEM, CONNECTION EXPANSION CONTROL PROGRAM, AND CONNECTION EXPANSION CONTROL METHOD

CROSS-REFERENCE TO RELATED APPLICATIONS

This application is based upon and claims the benefit of priority of the prior Japanese Patent Application No. 2010-115749, filed on May 19, 2010, the entire contents of which are incorporated herein by reference.

FIELD

Embodiments discussed herein relate to multistage connection control of a plurality of devices. For example, the embodiments relate to a connection expansion device such as a Serial Attached Small Computer System interface [Serial Attached SCSI (SAS)] expander or the like, a storage system including the connection expansion device, a connection expansion control program, and a connection expansion control method.

BACKGROUND

When a plurality of devices such as storage devices or the like are multistage-connected, a connection expansion device is used for connection expansion. For example, as multistage-connected SAS devices, SAS expanders are used for connection expansion. After being connected to the expander, an input-output (I/O) controller, which is a higher-level device of the expander, recognizes all devices controlled by the I/O controller by performing a state confirmation processing, called "Discovery", through the expander. The Discovery processing includes device recognition processing used for recognizing the state of a device, and in the device recognition processing, device abnormality such as a device failure, disconnection, or the like is recognized.

Usually, in such a storage system as described above, a configuration is adopted in which SAS devices are multistage-connected, information setting is performed on the SAS expanders, and the extraction of failure information and the like are performed. One of examples of the related art is Japanese Laid-open Patent Publication No. 2008-242872.

Incidentally, in the multistage connection configuration, when abnormality or the like occurs in a device controlled by a specific expander, and hence a configuration change occurs, the specific expander is put into a Configuring state. However, an expander other than the specific expander is also put into a Configuring state. In this case, it is difficult for the I/O controller to perform an I/O issue for a device controlled by the expander in the Configuring state. Namely, it is impossible to perform input-output access on the device controlled by the expander in the Configuring state.

In such a state described above, a multistage connection environment deteriorates, and the number of unusable devices increases if the scale of the multistage connection is large. Therefore, it is difficult to gain the benefit of the multistage connection environment.

SUMMARY

According to an aspect of the embodiment, a connection expansion device connected to devices includes a plurality of ports to which devices are connected, a storage unit configured to record device information obtained from each port, and a processing unit configured to specify, based on the device information, a port in which an abnormal device exists, invalidate device information belonging to the port, and cause the storage unit to hold device information of a normal device.

The object and advantages of the invention will be realized and attained by at least the features, elements, and combinations particularly pointed out in the claims.

It is to be understood that both the foregoing general description and the following detailed description are exemplary and explanatory and are not restrictive of the invention, as claimed. Additional aspects and/or advantages will be set forth in part in the description which follows and, in part, will be apparent from the description, or may be learned by practice of the invention.

BRIEF DESCRIPTION OF DRAWINGS

FIG. 10 is a diagram illustrating an example of a routing table;

FIG. 12 is a diagram illustrating an example of a routing table at the time of a normally functioning operation;

FIG. 13 is a diagram illustrating an example of a routing table before the completion of Discovery processing;

FIG. 14 is a diagram illustrating a routing table after the completion of Discovery processing;

FIG. 15 is a flowchart illustrating an example of a processing procedure of re-creation of a routing table;

FIGS. 16A and 16B are a flowchart illustrating an example of a processing procedure of Discovery processing (at an ordinary operation);

FIG. 19 is a diagram illustrating an example of a device map;

FIG. 21 is a diagram illustrating a device map after Discovery processing is performed;

FIG. 23 is a diagram illustrating an example of a routing table according to another embodiment;

FIG. 24 is a flowchart illustrating a comparative example of device recognition processing;

FIGS. 25A and 25B are a flowchart illustrating a comparative example of a creation procedure of a routing table.

DESCRIPTION OF THE EMBODIMENT

[First Embodiment]

Figure 1:
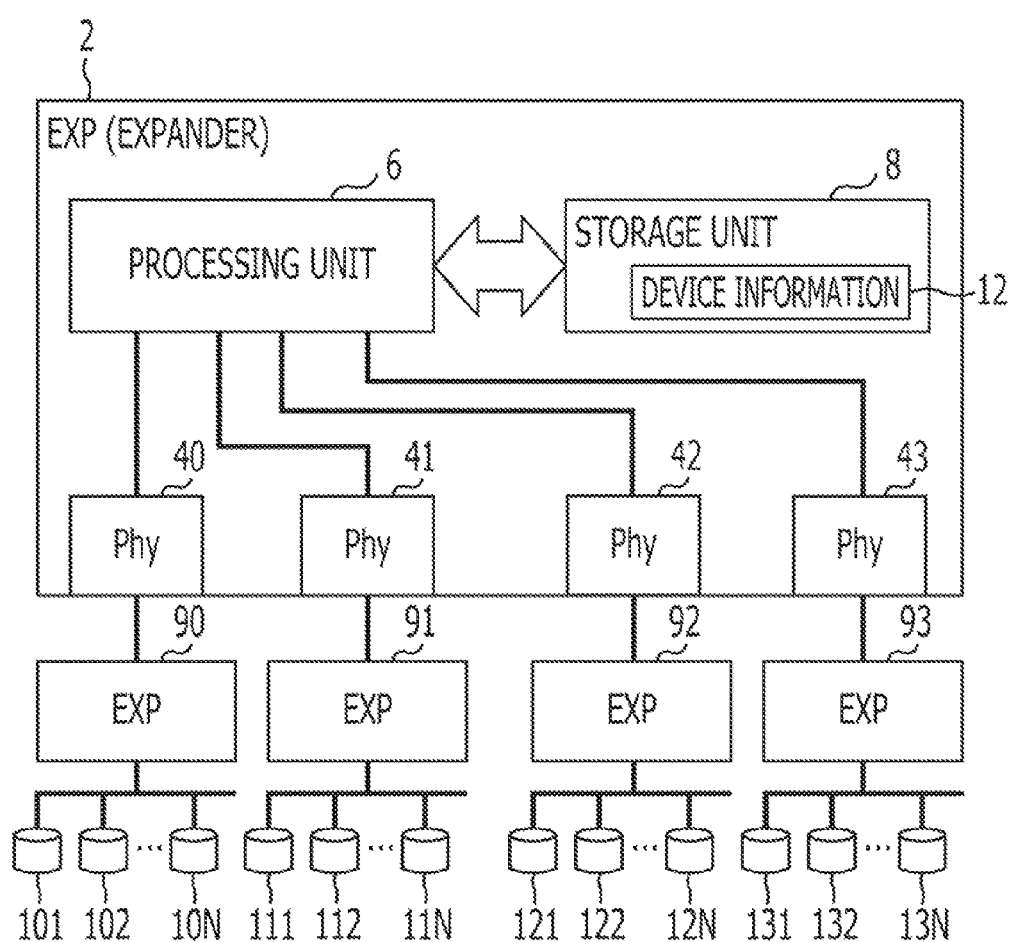
FIG. 1 is a diagram illustrating an example of a configuration of a multistage connection of expanders according to a first embodiment.

The first embodiment will be described with reference to FIG. 1. FIG. 1 illustrates an example of the configuration of the multistage connection of expanders.

An expander (EXP) 2 is an example of a connection expansion device of the present disclosure. In addition, while, using device information, the expander 2 specifies a port in which an abnormal device exists, and invalidates the device information belonging to the port, the expander 2 stores the device information of a normal device in a storage unit 8. The expander 2 is a switching device used for multistage-connecting devices such as a plurality of storage devices and switching the connections thereof, and, as illustrated in FIG. 1, the expander 2 includes a plurality of physical ports (Phys) 40, 41, 42, and 43, a processing unit 6, the already-described storage unit 8.

Each of the Phys 40, 41, 42, and 43 is a connection port to which a single device or a plurality of devices such as another expander, a storage device, and the like are connected. Devices 101, 102, ..., 10N are connected to the Phy 40 through an expander (EXP) 90, and devices 111, 112, ..., 11N are connected to the Phy 41 through an EXP 91. Devices 121, 122, ..., 12N are connected to the Phy 42 through an EXP 92, and devices 131, 132, ..., 13N are connected to the Phy 43 through an EXP 93. Here, for example, the devices 101 to 13N are SAS devices, and, specifically, are disk storage devices (HDDs).

The processing unit 6 is realized with a processor, and functions as a selection unit for the lower-level EXPs 90 to 93 connected to the Phys 40, 41, 42, and 43.

The storage unit 8 is a storage device that stores therein device information indicating the already-described devices, and records therein device information 12 obtained in device confirmation processing. In order to store the device information 12, a table may be created and the device information 12 may be stored in the table.

In such a configuration as described above, for example, as acquisition processing of state information, using device recognition processing performed in the EXP 2, all devices 101 to 13N notify the EXP 2 of device information. In response to the reception of the notification of the device information, the device information 12 indicating the state of each device is written into the storage unit 8 in the EXP 2. The device information 12 is stored in the storage unit 8, along with physical port information indicating the Phys 40 to 43.

In this case, the device information 12 includes information of both a normal device and an abnormal device. Accordingly, a physical port to which the abnormal device belongs is targeted using the state information, device information indicating the abnormal device is discarded or invalidated in units of physical ports to which abnormal devices belong, and device information indicating the normal device is held in the storage unit 8.

In such a configuration as described above, since the physical port, the device abnormality of which is given notice of, is targeted and the device information is discarded or invalidated in units of physical ports, it is possible for a physical port in which no abnormal device exists to perform an input-output operation (called "I/O issue"). Namely, configuration confirmation restricted to he physical port, the device abnormality of which is given notice of, is executed, and a situation is likely prevented in which the physical port in which no abnormal device exists is also put into a during-configuration-confirmation state. Therefore, since device confirmation processing and a confirmation device range are minimized, and it is possible for a normal device to perform an I/O issue, it is possible to take advantage of the multistage connection based on EXPs.

Figure 2:
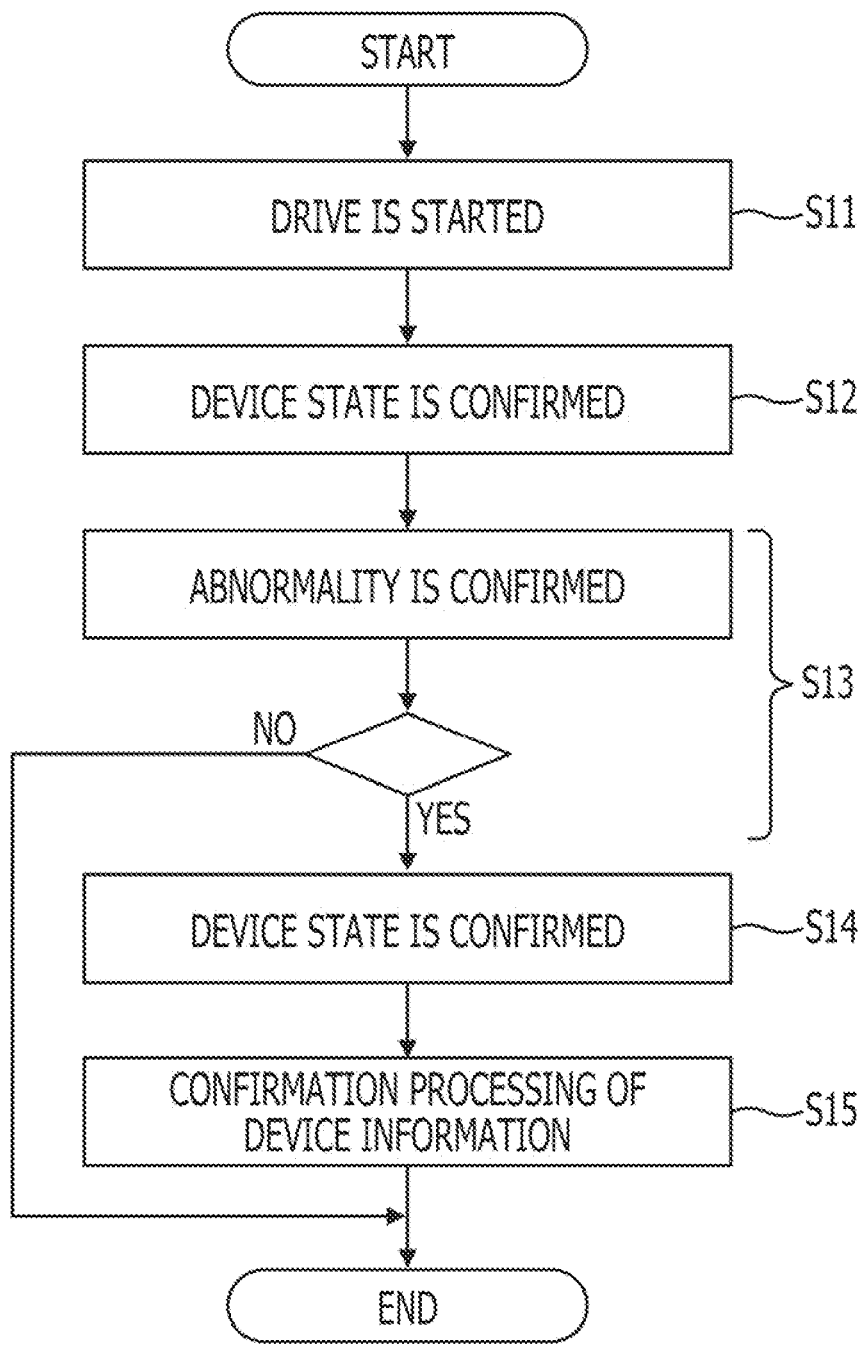
FIG. 2 is a flowchart illustrating an example of a processing procedure of device confirmation processing.

The processing procedure thereof will be described with reference to FIG. 2. FIG. 2 illustrates an example of the processing procedure of the device confirmation processing.

The processing procedure is an example of a connection expansion control method or a connection expansion control program of the present disclosure, and, as illustrated in FIG. 2, a drive operation is started on the basis of the application of power or a drive instruction (S11). The execution of the state confirmation of a device is triggered by the drive start (S12), and the device information 12 is stored as state information in the storage unit 8. For example, the device information 12 may be stored in the storage unit 8 in the form of a table such as an after-mentioned routing table or the like.

By referring to state information received from each of the Phys 40 to 43, the abnormality confirmation of a device is carried out (S13). If, on the basis of the abnormality confirmation, it is determined that no abnormal device exists, the processing operation is terminated. If an abnormal device exists, a physical port (in this case, one of the Phys 40, 41, 42, and 43) to which the abnormal device belongs is specified on the basis of the device information thereof (S14).

When the physical port to which the abnormal device belongs is specified, the confirmation processing of device information is executed (S15). In this case, device information belonging to the physical port to which the abnormal device belongs is discarded or invalidated, and device information belonging to a physical port to which a normal device belongs is held in the storage unit 8.

Therefore, for example, with respect to the abnormal device, only the Phy 43 is regarded, as the physical port to which the abnormal device belongs, as a state confirmation target, and state confirmation is performed on the Phy 43 (namely, partial state confirmation). In addition, another physical port is allowed to perform an I/O issue. In addition, if the state confirmation of the physical port to which the abnormal device belongs is completed, a content recorded in the storage unit 8 may be updated using the obtained device information.

If such a configuration as described above is adopted, the physical port to which the abnormal device belongs is targeted, device information belonging to the physical port is invalidated, and the device information of the physical port to which the normal device belongs is held. Therefore, input-output processing can be accelerated, and the usefulness of the multistage connection may be improved.

In addition, only the physical port to which the abnormal device belongs is specified, a during-configuration-confirmation state for each physical port can be minimized, and hence a processing operation ranging from the confirmation processing to an input-output state may be accelerated.

[Second Embodiment]

Figure 3:
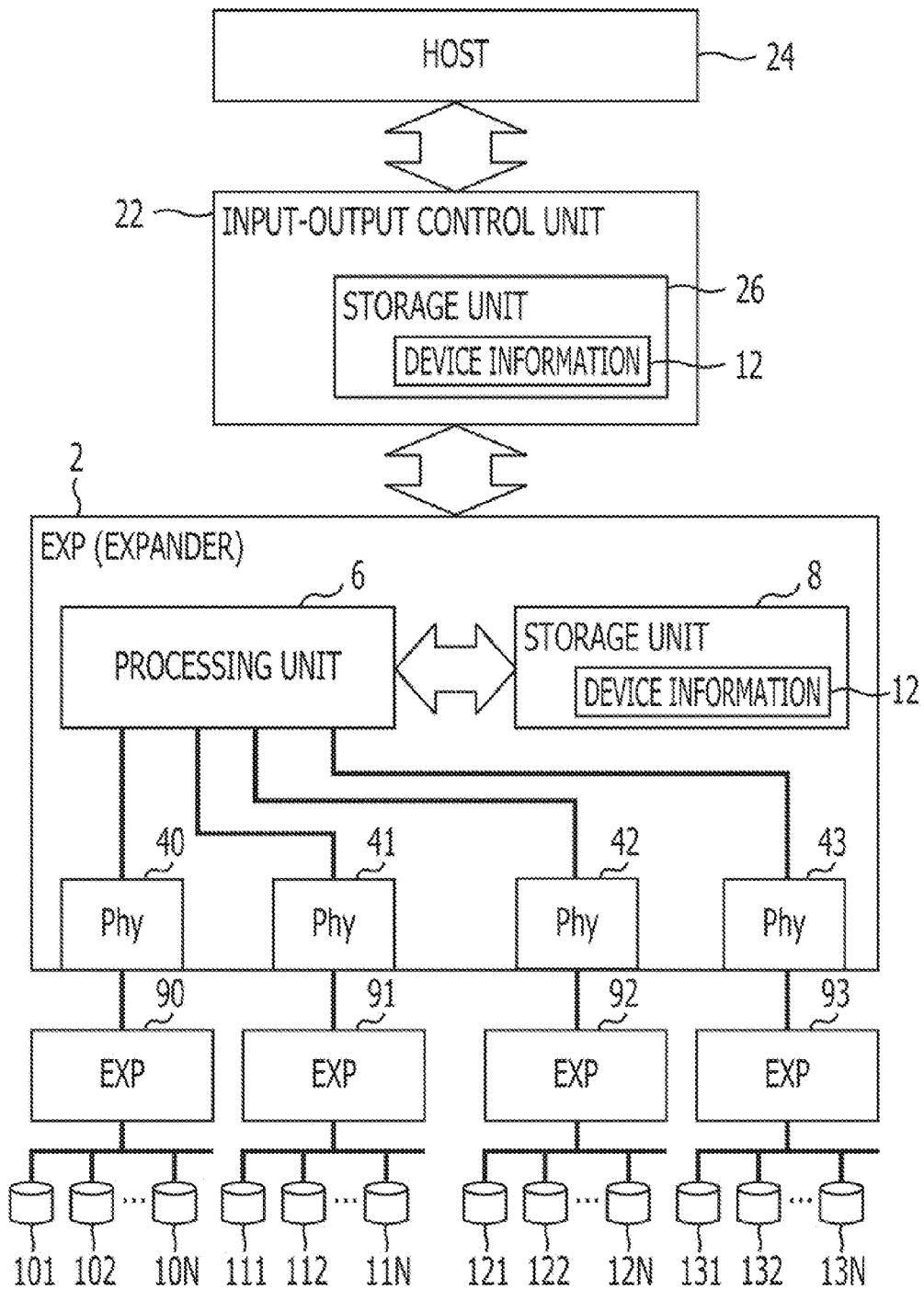
FIG. 3 is a diagram illustrating an example of a storage system according to a second embodiment.

A second embodiment will be described with reference to FIG. 3. FIG. 3 illustrates an example of a storage system according to the second embodiment. In FIG. 3, the same symbol is assigned to the same portion as that in FIG. 1.

The storage system 20 is an example of the storage system of the present disclosure and a storage system in which the already-described connection expansion device is used. Therefore, the storage system 20 includes an input-output control unit 22 and a host 24 on the higher-level side of the already-described EXP 2.

Since the EXP 2 is an example of a connection expansion unit and has the same as the already-described configuration, the description of each function unit thereof will be omitted.

The input-output control unit 22 includes a storage unit 26 that stores therein device information. The storage unit 8 is an example of a first storage unit, the storage unit 26 is an example of a second storage unit. The storage unit 26 is an example of storing means for storing the device information 12 on the higher-level side than the EXP 2. The device information 12 is provided as response information for an inquiry from the host 24.

The host 24 is a computer functioning as a higher-level device that controls writing and reading of data into and from the devices 101, 102, . . . , and 13N in the storage system 20.

According to such a configuration as described above, the EXP 2 is included as a connection expansion unit that includes the storage unit 8 used for storing the device information, a physical port in which an abnormal device exists is specified using the device information, and information indicating the physical port, the abnormality thereof, and the like is stored in the storage unit 8. In addition, the device information after the state confirmation processing is stored in the storage unit 8. Therefore, the device information 12 thereof is transferred to the storage unit 26, located on the input-output control unit 22 side, and stored therein.

The device information 12 is device information indicating a normal device, an abnormal device, and the like, and specifically, the device information 12 is information indicating validity or invalidity as a device number or status information. The device information 12 is given notice of in response to an inquiry from a higher-level device side such as the host 24 or the like.

Figure 4:
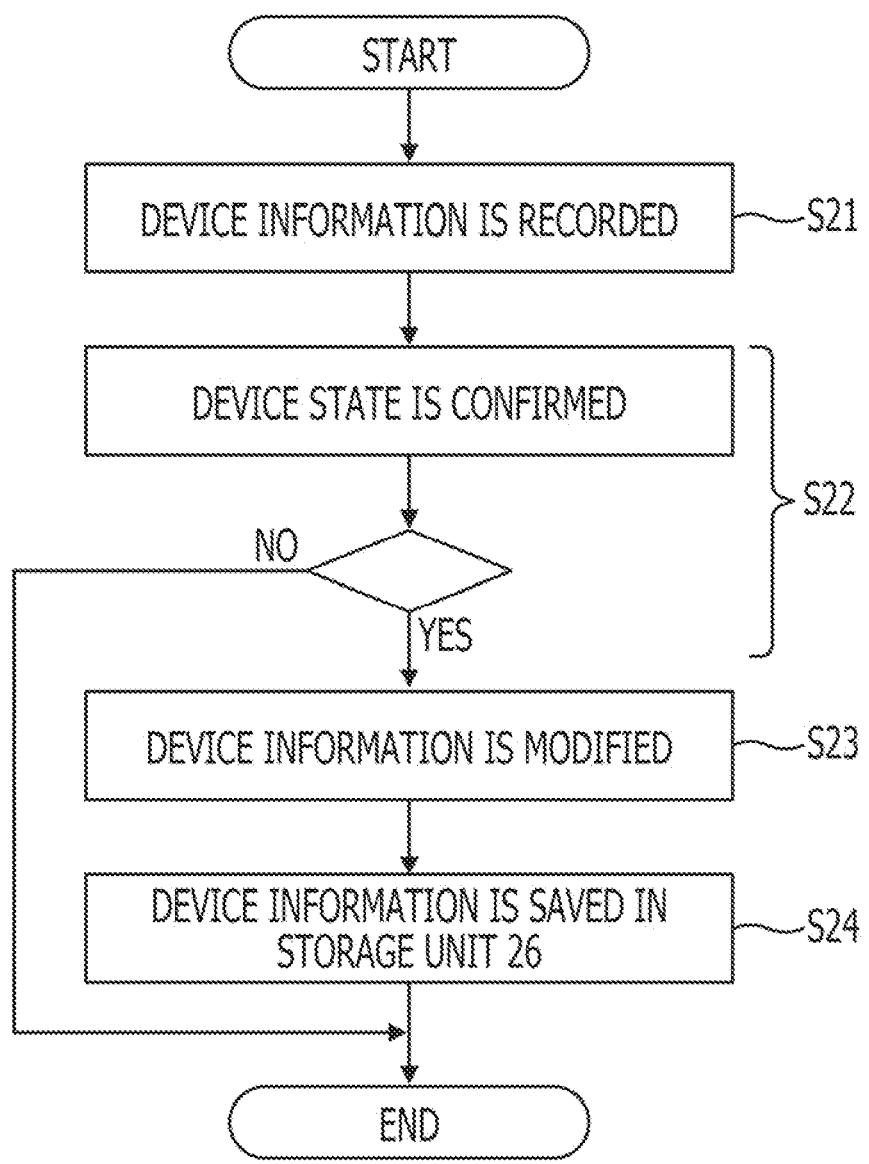
FIG. 4 is a flowchart illustrating an example of a processing procedure of a storage system.

Next, the processing procedure of the storage system 20 will be described with reference to FIG. 4. FIG. 4 illustrates an example of the processing procedure of the storage system.

The processing procedure is an example of the connection expansion control method or the connection expansion control program of the present disclosure, and, as illustrated in FIG. 4, the device information 12 obtained from a plurality of physical ports to which devices are connected is recorded in the storage unit 8 (S21). In this case, while, using the device information 12, a physical port in which an abnormal device exists is specified, and the device information 12 belonging to the physical port is invalidated, the device information 12 of a normal device is stored in the storage unit 8 (S22 and S23).

In addition, the device information 12 is transferred to the storage unit 26 in the input-output control unit 22 and stored therein (S24).

In this case, when the device information 12 varies, the information 12 on the storage unit 26 side may be modified in tandem with the device information 12 in the storage unit 8.

In this way, the device information 12 is held in the storage unit 26 in the input-output control unit 22 located on the higher-level side of the EXP 2, and the device information 12 is associated with the storage unit 8. Therefore, the latest device information 12 can be provided for an inquiry from the host 24 side, and the device information 12 is device information corresponding to the partial confirmation processing performed in the already-described EXP 2, thereby contributing to the acceleration of the input-output processing.

[Third Embodiment]

Figure 5:
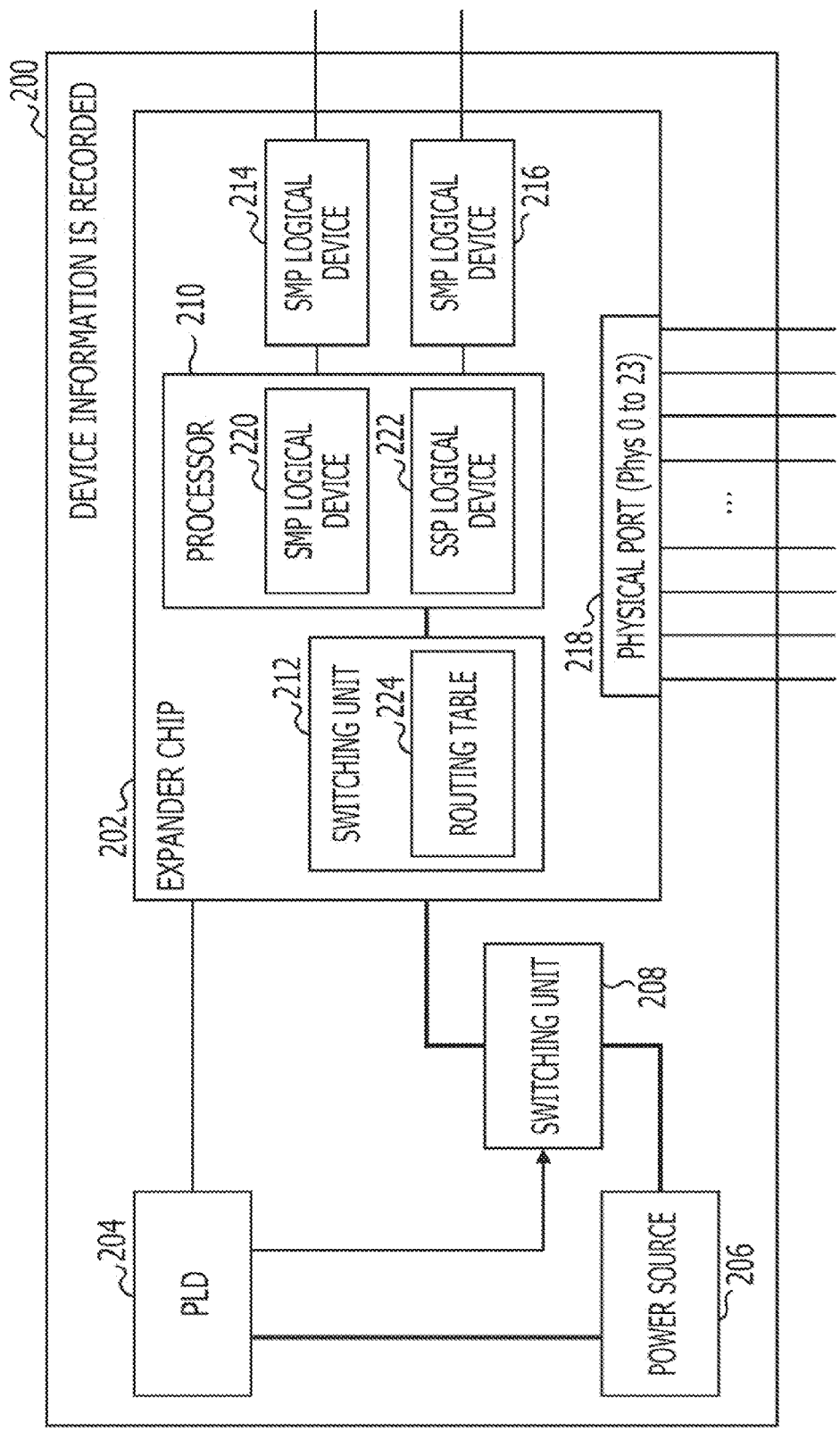
FIG. 5 is a diagram illustrating an example of an expander unit according to a third embodiment.

A third embodiment will be described with reference to FIG. 5. FIG. 5 illustrates an example of an expander unit.

An expander unit 200 is an example of the connection expansion device of the present disclosure, enables a number of devices to be connected, on the basis of the multistage connection of the EXPs, and realizes partial Discovery as partial state confirmation performed at the time of a state change. When a number of SAS devices such as storage devices or the like are connected, the expander unit 200 is used for expanding the SAS connection. As illustrated in FIG. 5, the expander unit 200 includes an Expander Chip 202, a Programmable Logic Device (PLD) 204, a power source 206, and a switching unit 208.

The expander chip 202 includes a processor 210, a memory 212, a port unit (Serial) 214, a port unit (Ether) 216, and a physical port 218. The processor 210 is processing means, which may correspond to the already-described processing unit 6 (in the first embodiment), and may control the selective connection of the SAS device. Therefore, the processor 210 includes a Serial Management Protocol (SMP) logical device 220 and a Serial SCSI Protocol (SSP) logical device 222, and also performs the control thereof, the control of the physical port 218 in the SAS, and the control of the port units 214 and 216.

The memory 212 is an example of the first storage unit, a routing table 224 described later is stored in the memory 212, and the routing table 224 is an example of means for storing the device information. The device information indicating a device with respect to each physical port is stored in the routing table 224.

The PLD 204 is a device operating with the power source 206 in a continuous connection state (continuous presence), and performs power feeding control for the expander chip 202 or the like. In this case, the control output of the PLD 204 is added to the switching unit 208, and power is fed from the power source 206 to the expander chip 202 through the conducted switching unit 208.

For example, the physical port 218 includes Phys 0 to 23 as a plurality of physical ports, and a storage device such as a hard disk drive (HDD), a solid state drive (SSD), or the like is connected, as an SAS device, to each of the Phys 0 to 23, for example.

Figure 6:
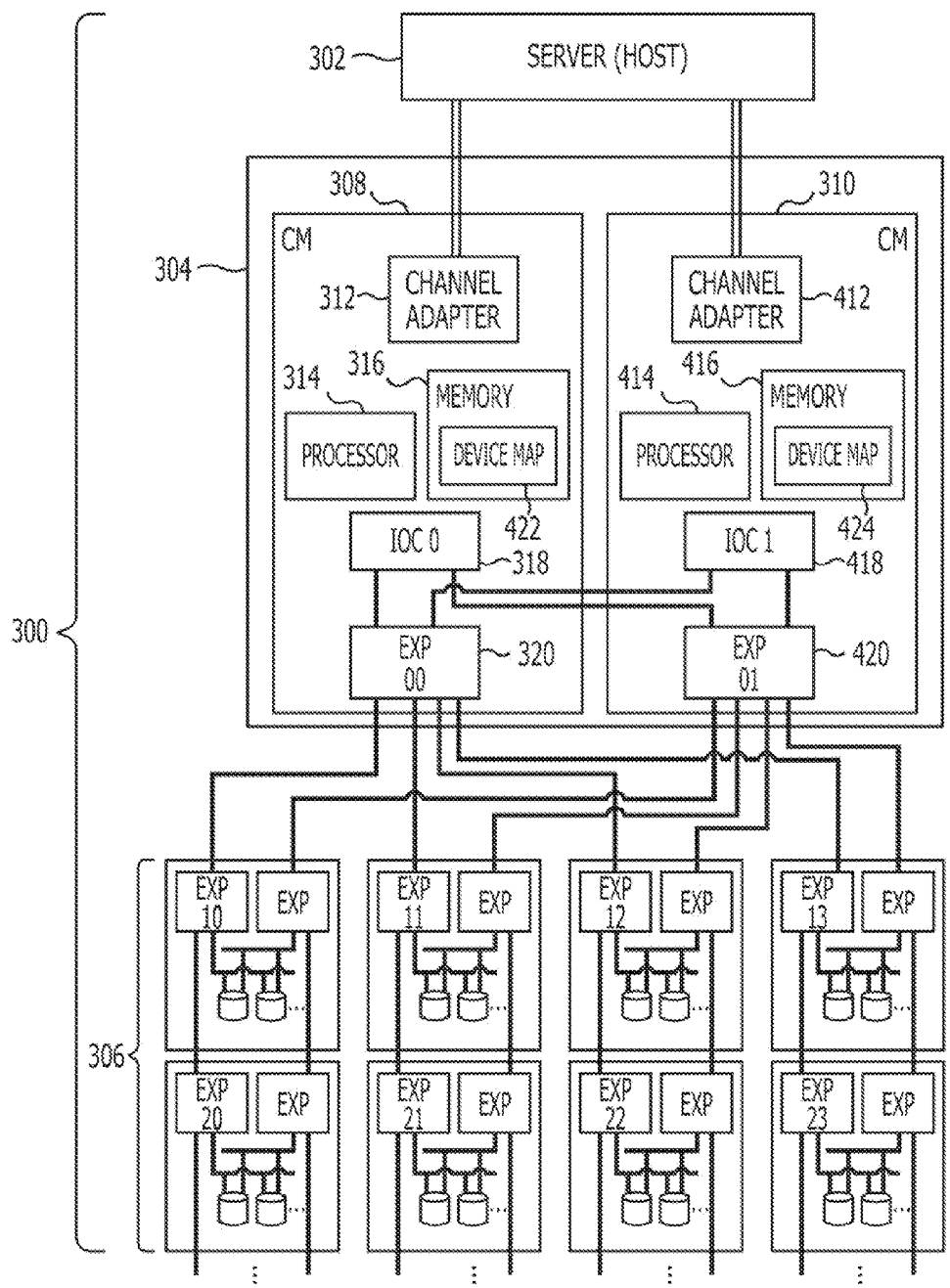
FIG. 6 is a diagram illustrating an example of a storage system.

Next, a storage system will be described with reference to FIG. 6. FIG. 6 illustrates an example of the storage system.

The storage system 300 is an example of the storage system of the preset disclosure, and includes the plural expander units 200 already described.

Therefore, as illustrated in FIG. 6, in the storage system 300, a multistage connection configuration of SAS devices is adopted in which the already described expander units 200 are used, and a server (host) 302, a chassis 304 located on the higher-level side, and a chassis group 306 including a plurality of chassis located on the lower-level side are included. The EXPs included in the chassis group 306 may include the already-described expander unit 200. While the server 302 is an example of a higher-level device corresponding to the already-described host 24 (in FIG. 3), and illustrated in the storage system 300, a configuration may be adopted in which the server 302 is the external device of the storage system 300.

The chassis 304 includes a first Controller Module (CM) 308 and a second Controller Module (CM) 310 as an example of the already-described input-output control unit 22 (in FIG. 3). The CM 308 includes a Channel Adapter 312, a processor 314, a memory 316, an SAS I/O controller 318 (IOC 0), and an EXP 320 (EXP 00). In addition, the other CM 310 also has the same configuration, and includes a Channel Adapter 412, a processor 414, a memory 416, an SAS I/O controller 418 (IOC 1), and an EXP 420 (EXP 01). The EXP 320 (EXP 00) and the EXP 420 (EXP 01) include the already-described expander units 200.

The memory 316 is an example of the second storage unit, and a device map 422 is stored in the memory 316. In addition, the memory 416 is an example of the second storage unit, and a device map 424 is stored in the memory 416. The device maps 422 and 424 form a second table with respect to the routing table 224 (in FIG. 5), and are means for storing the device information. Therefore, the device information of an abnormal device located on the EXP 00 side is stored in the device map 422, and the device information of an abnormal device located on the EXP 01 side is stored in the device map 424.

In addition, on the chassis group 306 side, when focusing on the EXP 320 (EXP 00), EXPs 10, 11, 12, and 13 are connected to the EXP 320, and EXPs 20, 21, 22, and 23 are provided on the lower-level side thereof.

In such a configuration as described above, an I/O access, issued from the server 302 to storage devices in the chassis group 306, such as HDDs, SSDs, or the like, through Host Interfaces such as an FC, an iSCSI, an SAS, and the like, is received by the Channel Adapters 312 and 412 in the CMs 308 and 310. In addition, the I/O of the SAS is issued from the IOCs 318 and 418 to a target SAS disk device through the EXP 00 or the EXP 01.

In addition, if the plural EXPs 00, 01, 10 to 13, and 20 to 23 are used in this way, a number of SAS devices can be multistage-connected to the IOCs 318 and 418.

Figure 7:
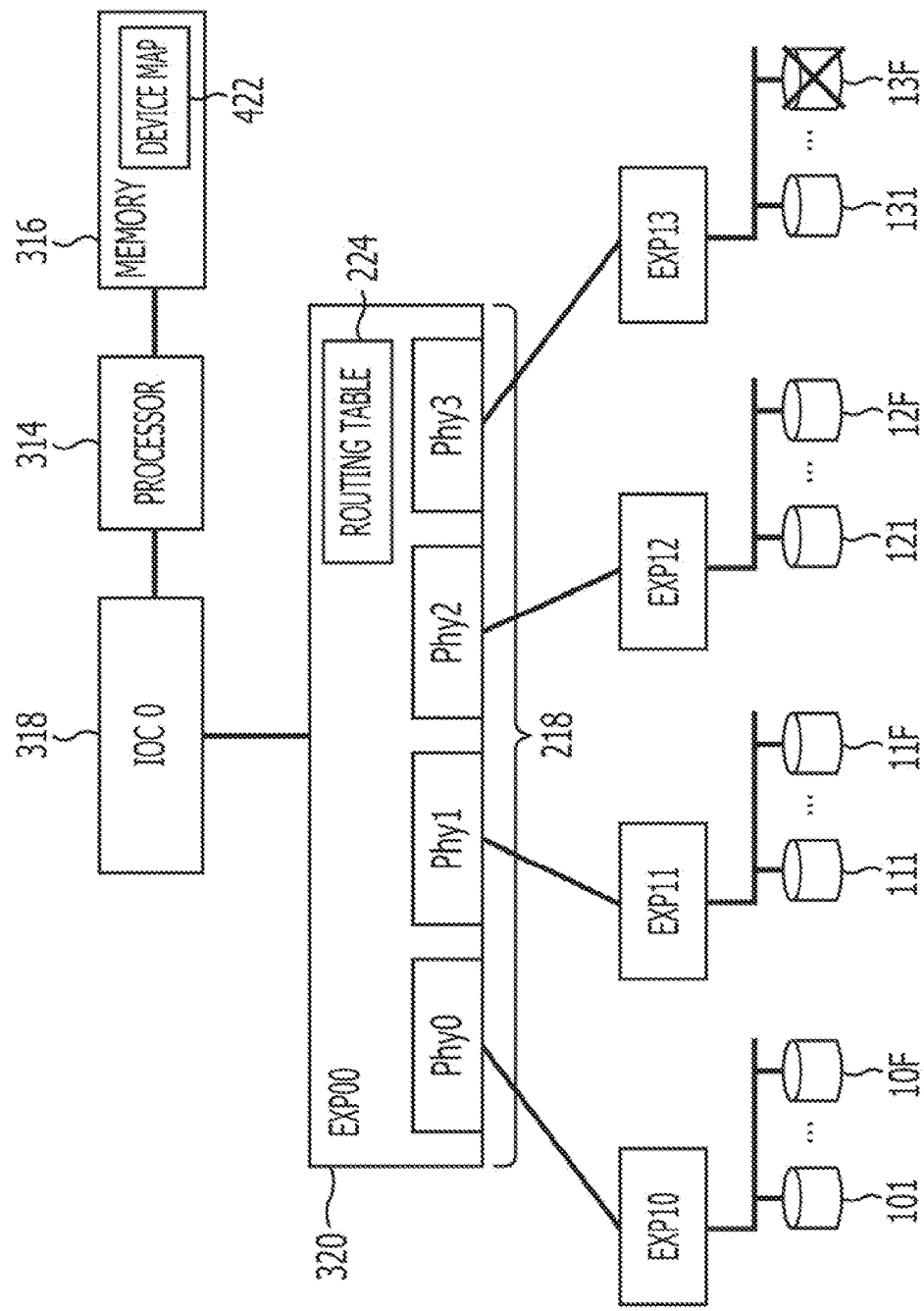
FIG. 7 is a diagram illustrating an overview of a storage system.

Next, a SAS connection configuration will be described with reference to FIGS. 7 and 8. FIG. 7 illustrates an example of the configuration of a simple SAS connection, and FIG. 8 illustrates an example of the multistage connection configuration of expanders.

When the IOC 318, the EXP 320 (EXP 00), and the EXPs 10 to 13 are extracted from the already-described example of the configuration (in FIG. 6), as illustrated in FIG. 7, a configuration is obtained in which the EXP 00 is connected to the IOC 318 and the EXPs 10 to 13 are connected to the lower-level side thereof. In addition, for example, a plurality of devices 101 . . . 10F are connected to the EXP 10, and a plurality of devices 111 . . . 11F are connected to the EXP 11. In addition, for example, a plurality of devices 121 . . . 12F are connected to the EXP 12, and a plurality of devices 131 . . . 13F are connected to the EXP 13. For example, these devices 101 to 13F are disk devices. In this case, a symbol "X" attached to the device 13F indicates that the device 13F is an abnormal device with a bad connection or the like.

In such a connection configuration as described above, after the completion of a connection, all devices controlled by the EXP 10 to the EXP 13 are recognized on the basis of the Discovery processing.

Figure 8:
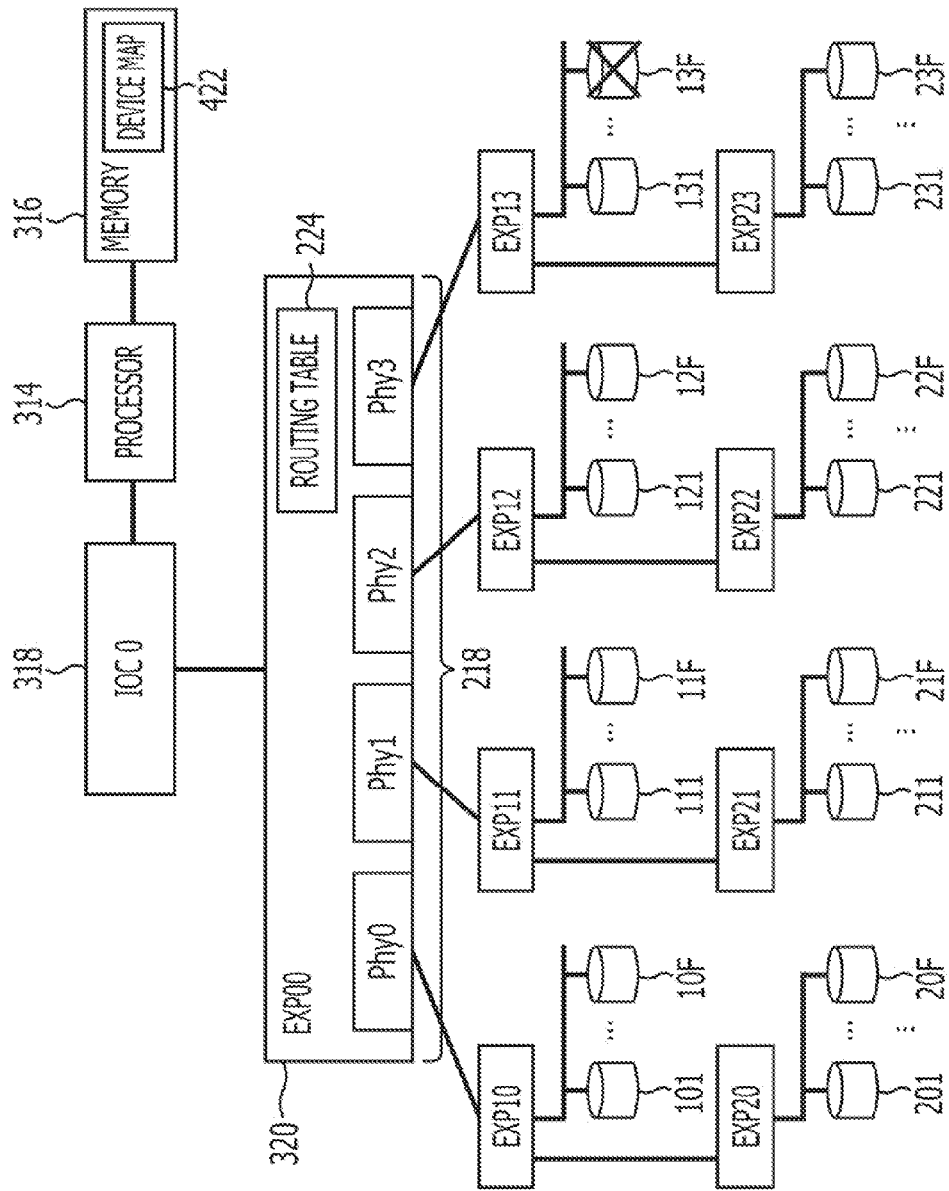
FIG. 8 is a diagram illustrating an example of a configuration of a multistage connection in which expanders are used.

In addition, when the IOC 318, the EXP 320, and the EXPs 10 to 13 and 20 to 23 are extracted from the already-described example of the configuration (in FIG. 6), as illustrated in FIG. 8, the EXP 320 is connected to the IOC 318. The EXPs 10 to 13 exist on the lower-level side of the EXP 320, and the EXP 20 is connected to the EXP 10, the EXP 21 is connected to the EXP 11, the EXP 22 is connected to the EXP 12, and the EXP 23 is connected to the EXP 13. On the basis of such a multistage configuration of EXPs as described above, a number of devices 101 to 13F and a number of devices 201 to 23F are connected, thereby allowing input-output processing to be performed. In the multistage configuration illustrated in FIG. 8, for convenience of description, "X" attached to the device 13F indicates that the device 13F is an abnormal device with a bad connection or the like.

Next, terms such as a command and the like used in the following processing procedure will be described.

With respect to "SMP Function", an SAS Management Protocol (SMP) is a protocol used for managing an SAS expander. The SMP is used for the control of a physical port (Phy), the construction of the routing information of an expander, the construction of a topology, link negotiation for an SAS connection, and the like. "Report General", "Discover", and "Report Route Information", described later, are included in the SMP Function. The "Report General", the "Discover", and the "Report Route Information" are issued from an IOC or a higher-level EXP to an EXP connected to a lower level.

The "Report General" is a command used for inquiring of an EXP about whether or not the EXP is in a Configuring state or the number of Phys the EXP has.

The "Discover" is a command issued for an EXP the connection state of a Phy in which is to be known, and returns the device information of a device directly connected to a Phy in the EXP that has received the command. The device information is information indicating a connected device, and is, for example, information indicating that the connected device is a storage device, information indicating that the connected device is an EXP, or the like.

The "Report Route Information" is a command used for acquiring the connection state of a controlled device, namely, a device connected to a lower-level-side EXP connected to an EXP that has received the "Report Route Information". Namely, the "Report Route Information" does not return the device information of a device directly connected to a Phy in the EXP that has received the command but returns the device information of all devices connected ahead of the EXP.

The "Broadcast (Change)" is a command used by an EXP to notify another device that a state change has occurred. When a state change such as Link Up or Down of a Phy, the removal or the insertion of a disk, or the like has occurred, the "Broadcast (Change)" is issued. It is difficult and/or impossible for a device that has received the Broadcast (Change) to identify which device has issued the Broadcast (Change).

Figure 9:
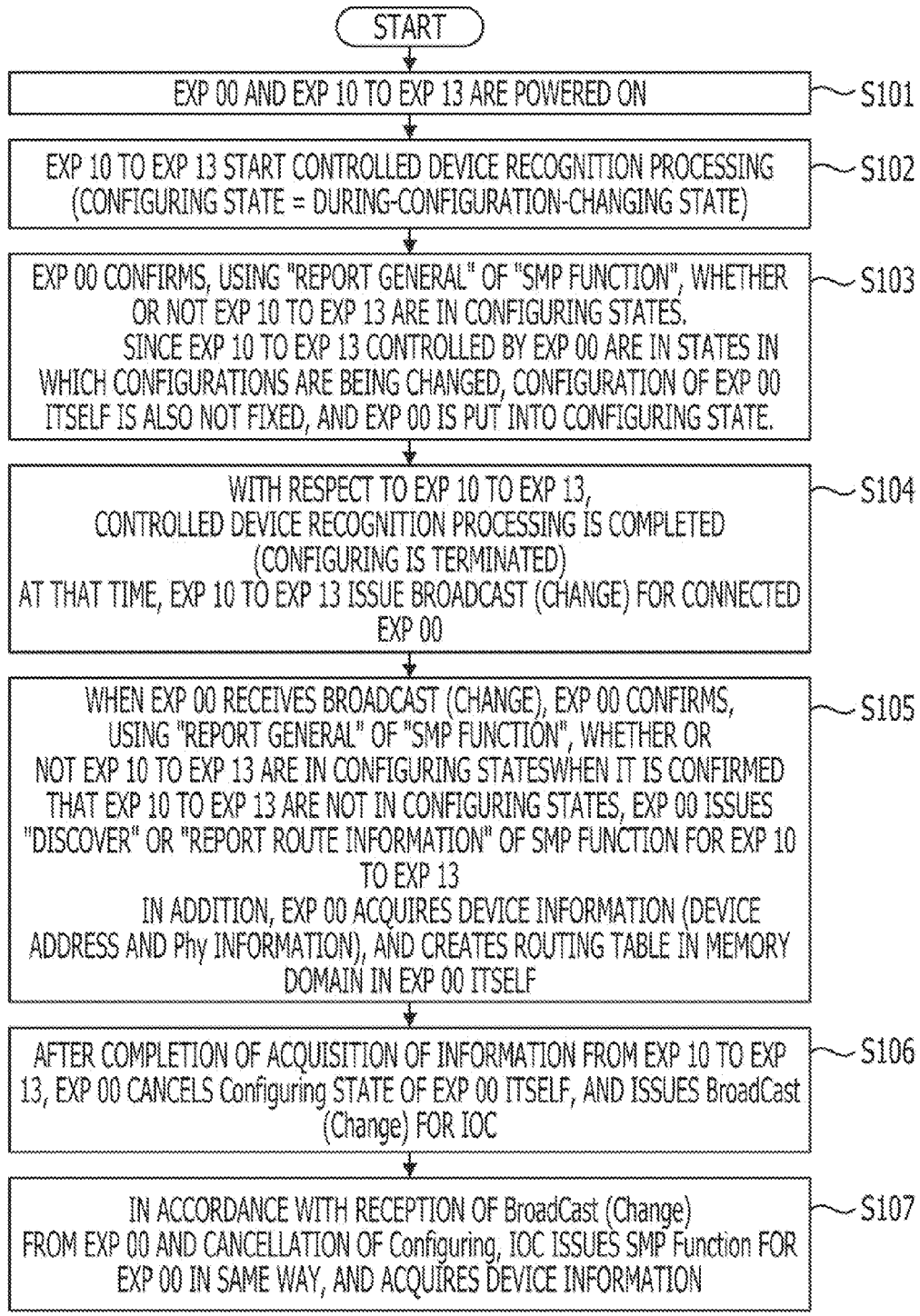
FIG. 9 is a flowchart illustrating an example of a processing procedure of device recognition processing.

Next, the procedure of the Discovery processing will be described with reference to FIG. 9. FIG. 9 illustrates the procedure of device recognition processing.

The processing procedure is the basic operation of the device recognition processing based on the Discovery processing, and is as follows.

1) The EXP 00 and the EXP 10 to EXP 13 are powered on (S101).

2) Owing to the start of power feeding, the EXP 10 to EXP 13 start controlled device recognition processing (S102). A Configuring state is put into a state in which a configuration is being changed.

3) The EXP 00 confirms, using the "Report General" of the "SMP Function", whether or not the EXP 10 to the EXP 13 are in Configuring states (S103). Since the EXP 10 to the EXP 13 controlled by the EXP 00 are in states in which configurations are being changed, the configuration of the EXP 00 itself is also not fixed, and the EXP 00 is put into a Configuring state.

4) With respect to the EXP 10 to the EXP 13, the controlled device recognition processing is completed (S104) (Configuring is terminated). At that time, the EXP 10 to the EXP 13 issue Broadcast (Change) for the connected EXP 00.

5) When the EXP 00 receives the Broadcast (Change), the EXP 00 confirms, using the "Report General" of the "SMP Function", whether or not the EXP 10 to the EXP 13 are in Configuring states (S105). In S105, when it is confirmed that the EXP 10 to the EXP 13 are not in Configuring states, the EXP 00 issues the "Discover" or the "Report Route Information" of the SMP Function for the EXP 10 to the EXP 13. In addition, the EXP 00 acquires device information (an SAS address and physical port information), and creates a Routing Table in a memory domain in the EXP 00 itself.

6) After the completion of the acquisition of information from the EXP 10 to the EXP 13, the EXP 00 cancels the Configuring state of the EXP 00 itself, and issues Broadcast (Change) for an IOC (S106).

7) In accordance with the reception of the Broadcast (Change) from the EXP 00 and the cancellation of Configuring, the IOC issues an SMP Function for the EXP 00 in the same way, and acquires device information (S107). After that, it becomes possible to perform I/O issue for all devices.

Accordingly, the basic operation of the device recognition processing performed in an IOC-expander configuration is terminated.

Next, the routing table 224 will be described with reference to FIG. 10. FIG. 10 is a diagram illustrating an example of a routing table.

The routing table 224 is functional means for routing the I/O of a device included in an EXP, and is provided in the memory 212 (in FIG. 5). On the basis of routing information stored in the routing table 224, the routing of an SAS address may be performed.

Therefore, as illustrated in FIG. 10, a physical port storage unit 426 and an index storage unit 428 are defined in the routing table 224. In this case, if it is assumed that the number of physical ports (Phys) in an EXP is M and the number of SAS addresses able to be described with respect to each Phy is N, Phy 0, Phy 1, . . . , and Phy M−1 are set, as physical port numbers indicating plural pieces of physical port information, in the physical port storage unit 426, for example, and Index 1, Index 2, . . . , and Index N are set, as index numbers indicating plural pieces of index information, in the index storage unit 428. In the embodiment, in the routing table 224, physical port numbers are set in a row direction, and index numbers are set in a column direction. In addition, in an item unit 430 specified with the two pieces of information, device addresses are stored.

In the routing table 224, for example, as an SAS device connected to each Phy in the EXP, the device address of an EXP or a disk is described. Namely, for example, in each item unit 430 specified with an index number and a physical port number, a device address is described in 8 bytes.

In addition, the routing table 224 is created by the Discovery processing performed in the EXP, namely, the device recognition processing. At the time of the start-up of the EXP or at the reception of Broadcast (Change) associated with a configuration change, the device recognition processing is executed. In the Discovery processing, "Report General", "Discover", and "Report Route Information" of the SMP Function are issued, and a device address connected to the control of the EXP is acquired.

Figure 11:
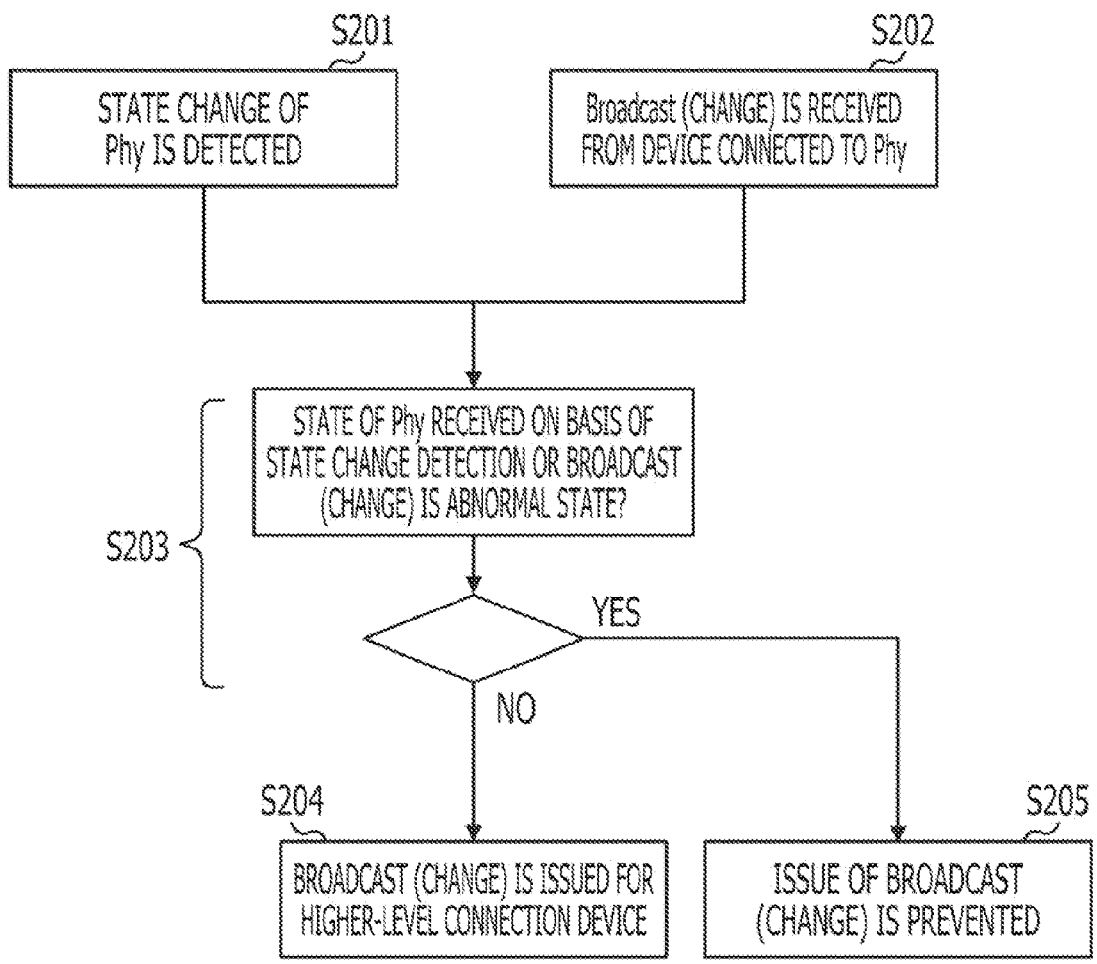
FIG. 11 is a flowchart illustrating an example of a processing procedure of Broadcast (Change) issue processing.

Next, Broadcast (Change) issue processing performed in an EXP will be described with reference to FIG. 11. FIG. 11 illustrates an example of the processing procedure of Broadcast (Change) issue processing performed in the EXP.

The Broadcast (Change) issue performed in the EXP is triggered by the detection of the state change of a Phy (S201) or the reception of Broadcast (Change) from a device connected to a Phy (S202).

It is determined whether or not the state of the Phy itself, received on the basis of the state change detection or the Broadcast (Change), is an abnormal state (S203). When the state of the Phy itself is not an abnormal state (S203: NO), Broadcast (Change) is issued for a higher-level connection device (S204). When the state of the Phy itself is an abnormal state (S203: YES), the issue of Broadcast (Change) is prevented (S205). In other words, in such processing as described above, when the Phy itself is abnormal, the issue of Broadcast (Change) is prevented, and when the Phy itself is normal, the issue of Broadcast (Change) is allowed.

The routing table 224 created in the Discovery processing will be described with reference to FIG. 12. FIG. 12 illustrates an example of the routing table at the time of a normally functioning operation.

As a result of the occurrence of Discovery processing in the EXP 00, as illustrated in FIG. 12, the routing table 224 is created in the EXP 00. In this case, in each item unit 430 specified with an index number and a physical port number, a specified device address (8 bytes) is described. An item to which no device is connected is set to a value "0", and the value "0" indicates an invalidity.

In the routing table 224, with respect to the Phy 0, Index 1=device 101, Index 2=device 102, . . . , and Index F=device 10F are described, and Index F+1, . . . , and Index N=0 are described. With respect to the Phy 1, Index 1=device 111, Index 2=device 112, . . . , and Index F=device 11F are described, and Index F+1, . . . , and Index N=0 are described. With respect to the Phy 2, Index 1=device 121, Index 2=device 122, . . . , and Index F=device 12F are described, and Index F+1, . . . , and Index N=0 are described. With respect to the Phy 3, Index 1=device 131, Index 2=device 132, . . . , and Index F=device 13F are described, and Index F+1, . . . , and Index N=0 are described. In addition, with respect to the Phy 4, . . . , and Phy M−13, Index 1, Index 2, . . . , and Index N=0 are described.

In this case, when the device 13F controlled by the EXP 13 becomes abnormal, the device 13F issues Broadcast (Change) for the EXP 00 that is a higher-level EXP, in accordance with the already-described processing procedure (in the flowchart illustrated in FIG. 11). The EXP 00 that has received the Broadcast (Change) is put into a Configuring state. Therefore, in accordance with the already-described flowchart illustrated in FIG. 9, the recognition processing of all connected devices is executed on the basis of Discovery processing, and hence the routing table 224 is re-created. At that time, with respect to the routing table 224, usually, after all held routing tables are discarded, a routing table is re-created on the basis of the Discovery processing. Therefore, during the execution of the Discovery processing, the routing table 224 is put into a state in which the routing table is being created with respect to all Phys, and hence it is difficult and/or impossible to perform a routing operation. As a result, it is difficult and/or impossible to issue I/O for an EXP and a device, controlled by the EXP 00, through the EXP 00.

However, in such a configuration as described above, it is possible for the EXP 00 to recognize which physical port (Phy) the Broadcast (Change) is received from. Therefore, it is possible to specify a location in which an abnormality occurs, on the basis of the Phy thereof, and it is possible to target the abnormal location.

In the example of the configuration illustrated in FIG. 7, when an abnormality occurs in a portion controlled by the Phy 3, it is possible for the EXP 320 (EXP 00) to recognize that the portion controlled by the Phy 3 is an abnormal location. In addition, only the received table information of the routing table 224, which relates to the Phy 3, may be discarded, the routing table 224 relating to Phys other than the Phy 3 may not be discarded or device information belonging to a specific Phy may be invalidated, and valid device information may be held.

Specifically, on the basis of the reception of Broadcast (Change), a Phy is specified to which the EXP 13 that has issued the Broadcast (Change) and is in a Configuring state is connected. In this case, on the routing table 224, only items described in the column of the Phy are discarded, namely, discard processing (0 Clear) is executed. Accordingly, a routing table relating to the Phy 0, the Phy 1, and the Phy 2 remains, and hence it is possible to constantly perform a routing operation on devices controlled by the Phy 0, the Phy 1, and the Phy 2.

Here, the invalidation of the Phy 3 and the completion of Discovery processing will be described with reference to FIGS. 13 and 14. FIG. 13 illustrates a routing table when the Phy 3 is invalidated, and FIG. 14 illustrates a routing table after the completion of Discovery processing for the Phy 3.

As illustrated in FIG. 13, when the Phy 3 is invalidated, values of Index 1, Index 2, . . . , and Index N are updated to a value "0" with respect to the Phy 3, and the Phy 3 is discarded. As described previously, "0" invalidates the Phy 3. In this case, as described previously, valid devices are described in the Phy 0, the Phy 1, and the Phy 2.

In addition, as illustrated in FIG. 14, if Discovery of the Phy 3 is completed, valid devices are described in the Phy 3. Namely, with respect to the Phy 3, Index 1=device 131, Index 2=device 132, and Index F, . . . , and Index N=0 are described. In this case, device 13F=0, and the device 13F is invalidated in the Phy 3. In addition, devices 131 and 132 that have been validated, and hence it is possible to perform a routing operation.

Next, the re-creation processing of the routing table 224 will be described with reference to FIG. 15. FIG. 15 illustrates the processing procedure of the re-creation processing of the routing table.

As illustrated in FIG. 15, the processing procedure of the re-creation of the routing table 224 is triggered by the reception of Broadcast (Change). In accordance with the abnormality of a controlled device, the Broadcast (Change) is issued from an EXP that is in a Configuring state, and is received by a higher-level EXP. Therefore, owing to the reception of the Broadcast (Change), a state transits to a Configuring state, and, at that time, a physical port number is set to X (=0) (S301). With respect to a physical port (Phy), a number indicating the physical port is set to Phy=X, and it is determined whether or not a physical port number that has received the Broadcast (Change) is X (S302). If the physical port number is not X (S302: NO), the X is incremented (S303), and the processing returns to S302.

If the physical port number is X (S302: YES), the physical port number that has received the Broadcast (Change) is X (S304). Namely, on the basis of the state information, it is recognized that a physical port in which an abnormal device exists is X.

In addition, a processing operation for discarding a table that is located in the routing table 224 and corresponds to the Phy=X is executed, and "0" clear is executed with respect to the Phy=X (S305). Owing to the execution of the "0" clear, the routing table 224 is put into a state illustrated in FIG. 13.

Accordingly, Discovery processing is started for the Phy=X that is a specified physical port (S306), and the processing operation is put into a state in which the completion of Discovery processing of an EXP controlled by the Phy=X is waited for. If the Discovery processing is completed with respect to the Phy=X, the device address of the EXP controlled by the Phy=X is acquired (S307). Namely, the address of an abnormal device can be acquired. Namely, partial Discovery is completed.

In addition, the routing table 224 including the table (item) of the Phy=X is created (the state illustrated in FIG. 14), the processing transits from the Configuring state to a normal state (S308), and the processing is terminated.

Figure 16A:
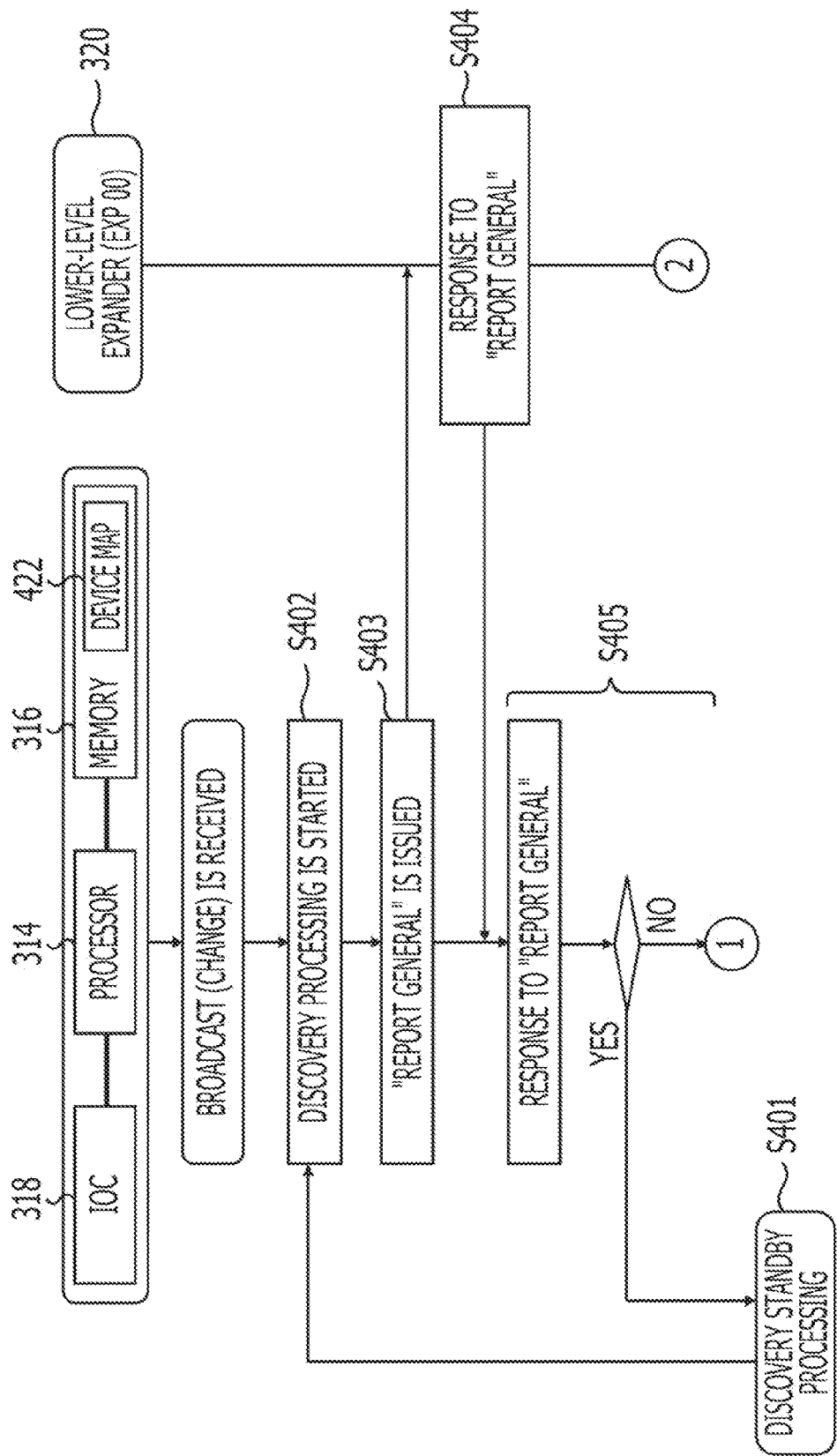

Therefore, processing operations performed in the processor 314, the memory 316, and the IOC 318 will be described with reference to FIGS. 16A and 16B. FIGS. 16A and 16B illustrate an example of the processing procedure of partial Discovery processing.

The processing procedure includes the processing procedure of the already-described partial Discovery. Therefore, in the processing procedure, the IOC 318 receives Broadcast (Change) from the EXP 320 (EXP 00), and hence it is recognized that the configuration of a device controlled by the EXP 00 has been changed, thereby starting Discovery processing. In the same way as in the EXP, "Report General" that is a command of the SMP Function is issued, the cancellation of the Configuring state of the EXP 00 is waited for, and the address of a connected device is acquired using "Discover" or "Report Route Information" that is a command of the SMP Function.

As illustrated in FIGS. 16A and 16B, Discovery processing performed on the IOC 318 side is triggered by the reception of Broadcast (Change), the Discovery processing is started (S402) from Discovery standby processing (S401), and the command "Report General" is issued (S403). The EXP 00 that is a lower-level EXP and has received the command "Report General" responds to the "Report General" (S404). The IOC 318 side and the processor 314 side receive the response to the "Report General", and determine, on the basis of the response to the "Report General", whether or not the EXP 00 is in a Configuring state (S405).

If the EXP 00 is in the Configuring state (S405: YES), the processing returns to the Discovery standby processing (S401). If the EXP 00 is not in the Configuring state (S405: NO), commands "Discover" are issued that are as many as a number indicated by a physical port number (NUMBER OF PHYS) from the response to the "Report General" (S406). In this case, the response to the "Discover" is received from the EXP 00 (S407 and S408), and the address of a device directly connected to the EXP 00 is acquired (S406).

In addition, the IOC 318 side and the processor 314 side issue the command "Report Route Information" (S409), receive the response to the "Report Route Information" from the EXP 00 (S410), and acquire the address of a device located on the even lower side of the EXP 00 (S409).

Accordingly, the Discovery processing is terminated (S411), the device address of a device controlled by the EXP 00 is acquired, and the processing is terminated. The same processing is also performed for the EXP 01.

In this way, in the normal Discovery processing, "Report General" of the SMP Function is issued for the EXP 00, and the cancellation of the Configuring state is waited for. In addition, even if the EXP 00 is under Configuring, it is possible to perform I/O processing when no abnormality occurs. Even if the abnormality occurs, it is only necessary to sort a normal device and an abnormal device, controlled by the EXP, in order to continue the I/O processing. As the sorting means, device information (an address and physical port information) may be acquired from an EXP in which there is no abnormal location, for example.

Figure 17:
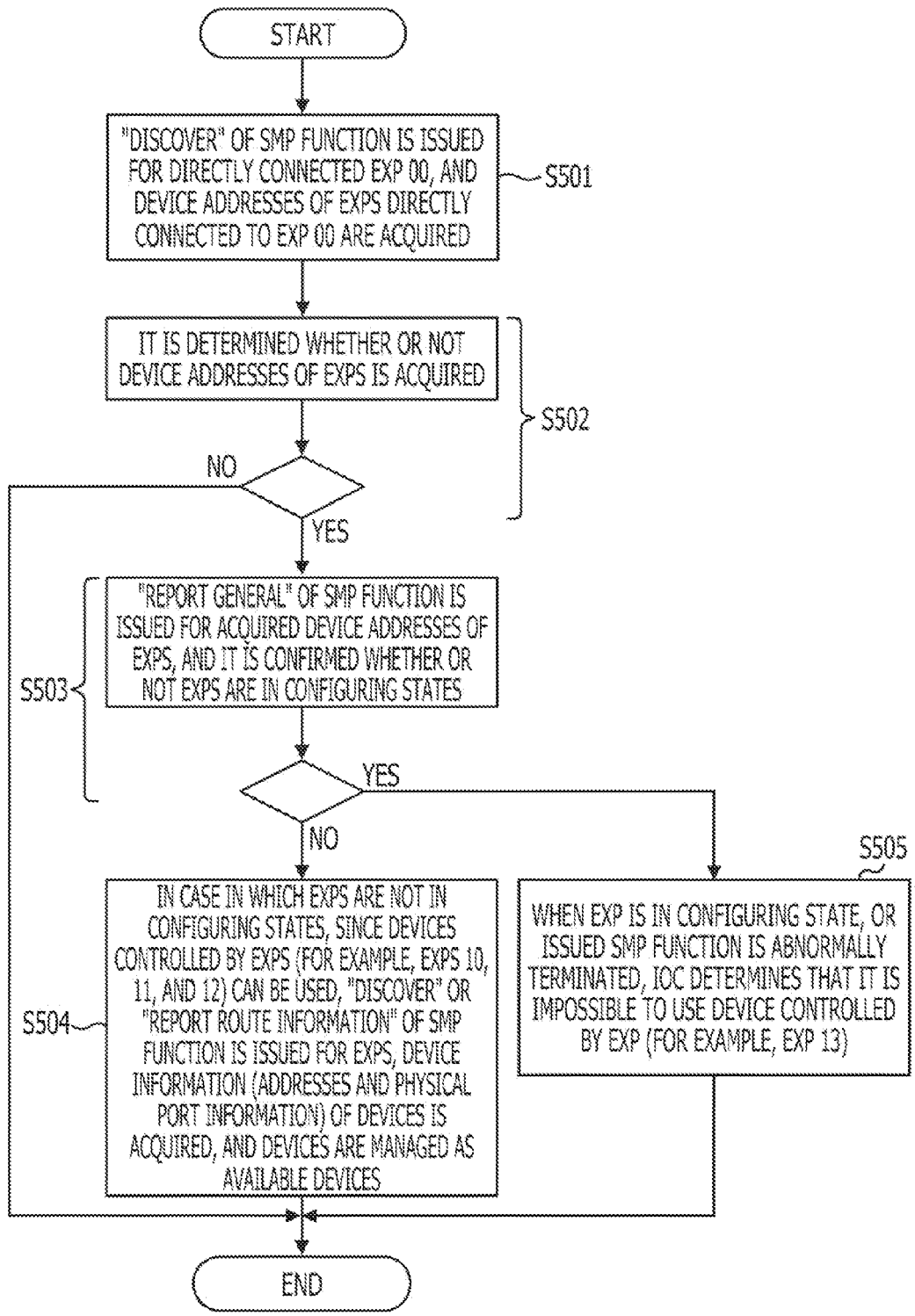
FIG. 17 is a flowchart illustrating an example of a processing procedure of acquisition processing of device address information.

Specifically, when the EXP 00 is put into a Configuring state, a command of the SMP Function is issued from the IOC 318, as the following partial Discovery, and it is only necessary to sort an abnormal portion. The processing procedure will be described with reference to FIG. 17. FIG. 17 illustrates an example of the processing procedure of the sorting of an abnormal portion.

1) "Discover", a command of the SMP Function, is issued for the directly connected EXP 00, and the device address of an EXP directly connected to the EXP 00 is acquired (S501). In S501, for example, the device addresses of the EXPs 10, 11, 12, and 13 are acquired, and it is determined whether or not the device addresses of the EXPs are acquired (S502). When the device addresses of the EXPs are not acquired, the processing is terminated.

2) When the device addresses of the EXPs can be acquired, "Report General" that is a command of the SMP Function is issued for the acquired device addresses of the EXPs, and it is confirmed whether or not the EXPs are in Configuring states (S503).

3) When, in S503, it is confirmed that the EXPs are not in Configuring states (S503: NO), "Discover" or "Report Route Information", a command of the SMP Function, is issued for the EXPs (for example, the EXPs 10, 11, and 12) (S504). In this case, since devices controlled by the EXPs 10, 11, and 12 can be used, the device information (e.g., addresses and physical port information) of the devices is acquired, and the devices are managed as available devices.

4) When, in S503, it is confirmed that an EXP is in a Configuring state (S503: YES), or the issued SMP Function is abnormally terminated, the IOC 318 determines that it is difficult and/or impossible to use a device controlled by the EXP (for example, the EXP 13) (S505).

Figure 18A:
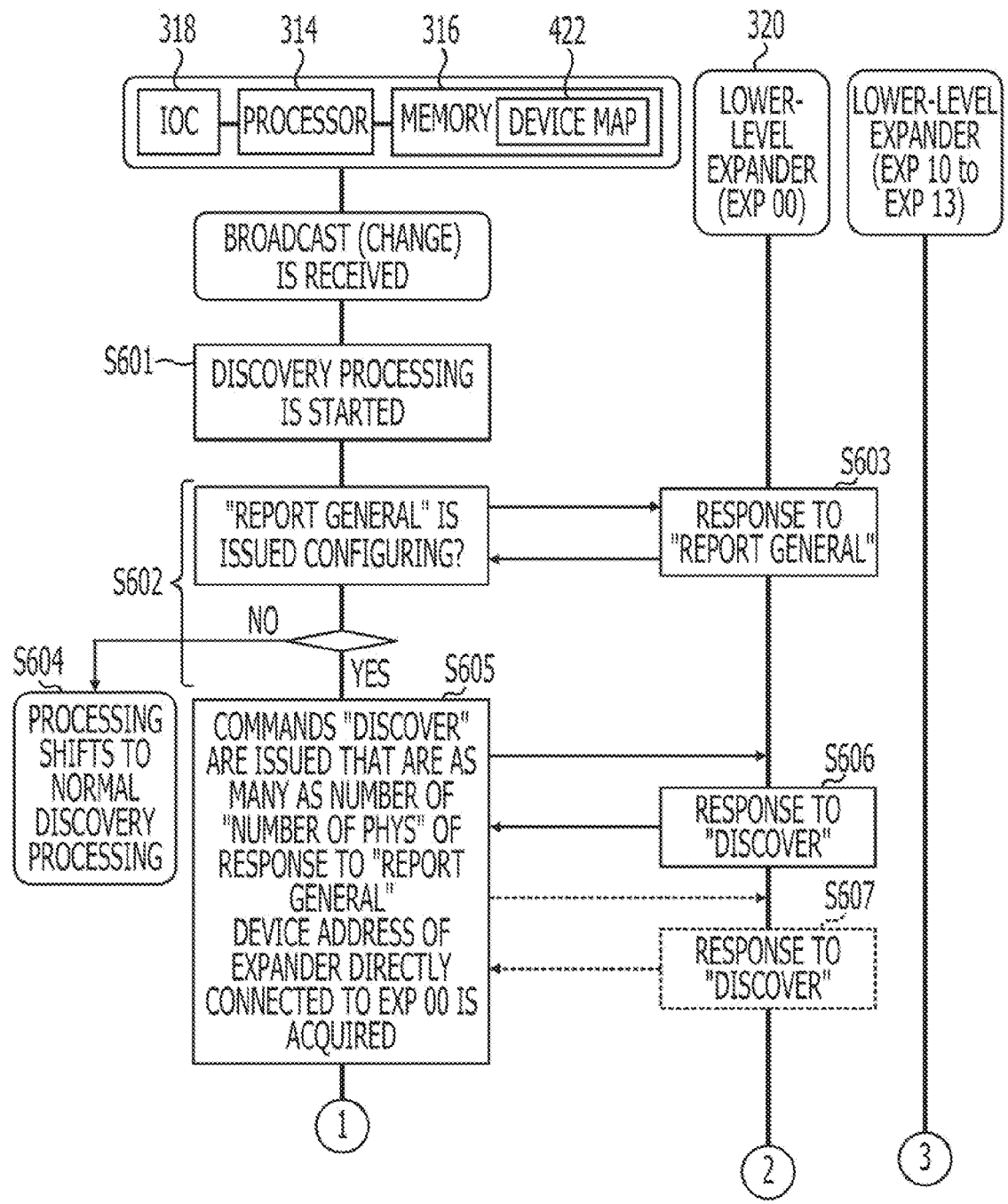
FIGS. 18A and 18B are a flowchart illustrating an example of a processing procedure of device information acquisition processing.
Figure 18B:
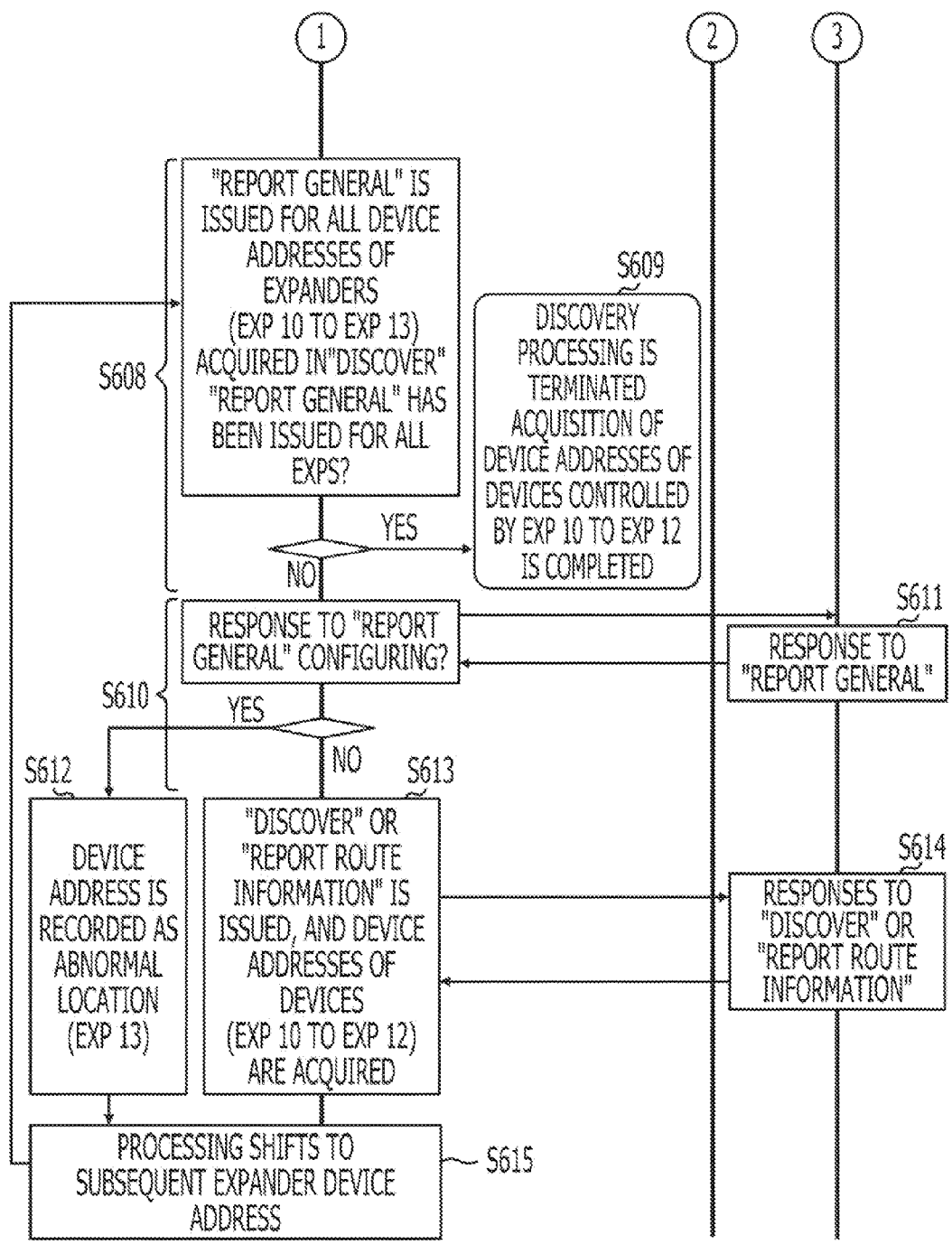

Next, example details of the processing procedure (in FIG. 17) will be described with reference to FIGS. 18A and 18B. FIGS. 18A and 18B illustrate an example of the processing procedure of Discovery.

The processing procedure is an example of processing operations performed in the processor 314, the memory 316, and the IOC 318. As illustrated in FIGS. 18A and 18B, the reception of Broadcast (Change) triggers the Discovery processing to be started (S601), the command "Report General" is issued for the EXP 00 that is a lower-level EXP, and it is confirmed whether or not the EXP 00 is in a Configuring state (S602). In this case, in S602, on the basis of the response to the "Report General" from the EXP 00 (S603), it is confirmed whether or not the EXP 00 is in a Configuring state. In addition, when the EXP 00 is not in a Configuring state (S602: NO), the processing shifts to normal Discovery processing (S604).

If the EXP 00 is in the Configuring state (S605: YES), commands "Discover" are issued that are as many as the number of "NUMBER OF PHYS" of the response to the "Report General", and the device address of an EXP directly connected to the EXP 00 is acquired (S605). In this case, the response to the command "Discover" is received from the EXP 00 (S606 and S607).

The command "Report General" is issued for all device addresses (EXP 10 to EXP 13) acquired in "Discover", and it is confirmed whether or not the command "Report General" has been issued for all EXPs (S608).

When the "Report General" has been issued for all EXPs (S608: YES), the Discovery processing is terminated, and, in this case, the acquisition of the device addresses of the devices controlled by the EXP 10 to EXP 12 is completed (S609).

When the "Report General" has not been issued for all EXPs (S608: NO), the response to the "Report General" is received, and it is confirmed whether or not the EXP is in a Configuring state (S610). In this case, the responses to the "Report General" are received from the EXP 10 to EXP 13 that are lower-level EXPs (S611).

When the EXP is in a Configuring state (S610: YES), the device address thereof is recorded as an abnormal location (S612). In this case, when the EXP 13 is in a Configuring state, the device address thereof is recorded as an abnormal location.

When the EXP is not in a Configuring state (S610: NO), the command "Discover" or the command "Report Route Information" is issued, and the device addresses of the devices (EXP 10 to EXP 12) are acquired (S613). In this case, the responses to the "Discover" or the "Report Route Information" are received from the EXP 10 to EXP 12 (S614).

In addition, after the processing operations performed in S612 and S613, the processing shifts to the device address of a subsequent EXP (S615), and the same processing as described above is executed.

On the basis of such a procedure as described above, even if the EXP 00 and the EXP 13 are in Configuring states, the IOC 318 can acquire the addresses of devices connected to the control of the EXPs 10, 11, and 12. These acquired addresses are the addresses of available devices subjected to the routing performed by the EXP 00. Substantially immediately after the device 13F controlled by the EXP 13 becomes abnormal (in a case in which the EXP 13 is put into a Configuring state), the IOC 318 recognizes, as available devices, devices 101 to 10F controlled by the EXP 10, devices 111 to 11F controlled by the EXP 11, and devices 121 to 12F controlled by the EXP 12, and holds the recognition result as a device map. At that time, the recognition result is written into the device map 422 (in FIG. 19). In this case, in the device map 422, the device address is stored in each item indicated by an index, and "0" is written for an invalid device.

Next, the device map 422 will be described with reference to FIG. 19. FIG. 19 is a diagram illustrating an example of the device map.

An index storage unit 432 and an address storage unit 434 are set in the device map 422. An index number is stored in the index storage unit 432, and a device address is stored in the address storage unit 434. In this case, as illustrated in FIG. 19, available device addresses are stored along with index numbers. A value "0" indicating invalidity is stored in an invalid device along with the index number.

According to such a configuration as described above, when the server 302 (in FIG. 6) makes an access request to a device, the device map 422 acquired on the basis of the Discovery processing of the IOC is used. In that case, with respect to the device to which the access request is made, the processor 314 (in FIG. 6) determines, on the basis of information stored in the device map 422, whether or not it is possible to use the device, and notifies the server 302 of the determination result.

When, on the basis of the procedure hitherto described, it is confirmed that the EXP 00 and the EXP 13 are in Configuring states, the IOC 318 has created the device map 422 illustrated in FIG. 19. However, when the Configurations of the EXP 00 and the EXP 13 are completed, usually the IOC 318 acquires all device information again. Usually, all device information of the EXPs 10, 11, 12, and 13 is acquired again.

In this case, since information has been able to be partially acquired on the basis of the above-mentioned procedure (the device information controlled by the EXPs 10, 11, and 12 is held), only the acquisition processing of device information controlled by the EXP 13 is performed. Therefore, the acquisition processing of the device information performed in the IOC 318 may be shortened. Specifically, in accordance with the processing procedure illustrated in FIGS. 18A and 18B, the IOC 318 stores by which Phy of the EXP 00 device information, which has not been acquired, is controlled. In addition, in re-recognition processing, the IOC 318 performs the Discovery processing (in FIG. 20), namely, the partial Discovery processing, on a device controlled by the Phy, and, after the processing, modifies the device map 422 (in FIG. 21).

Figure 20:
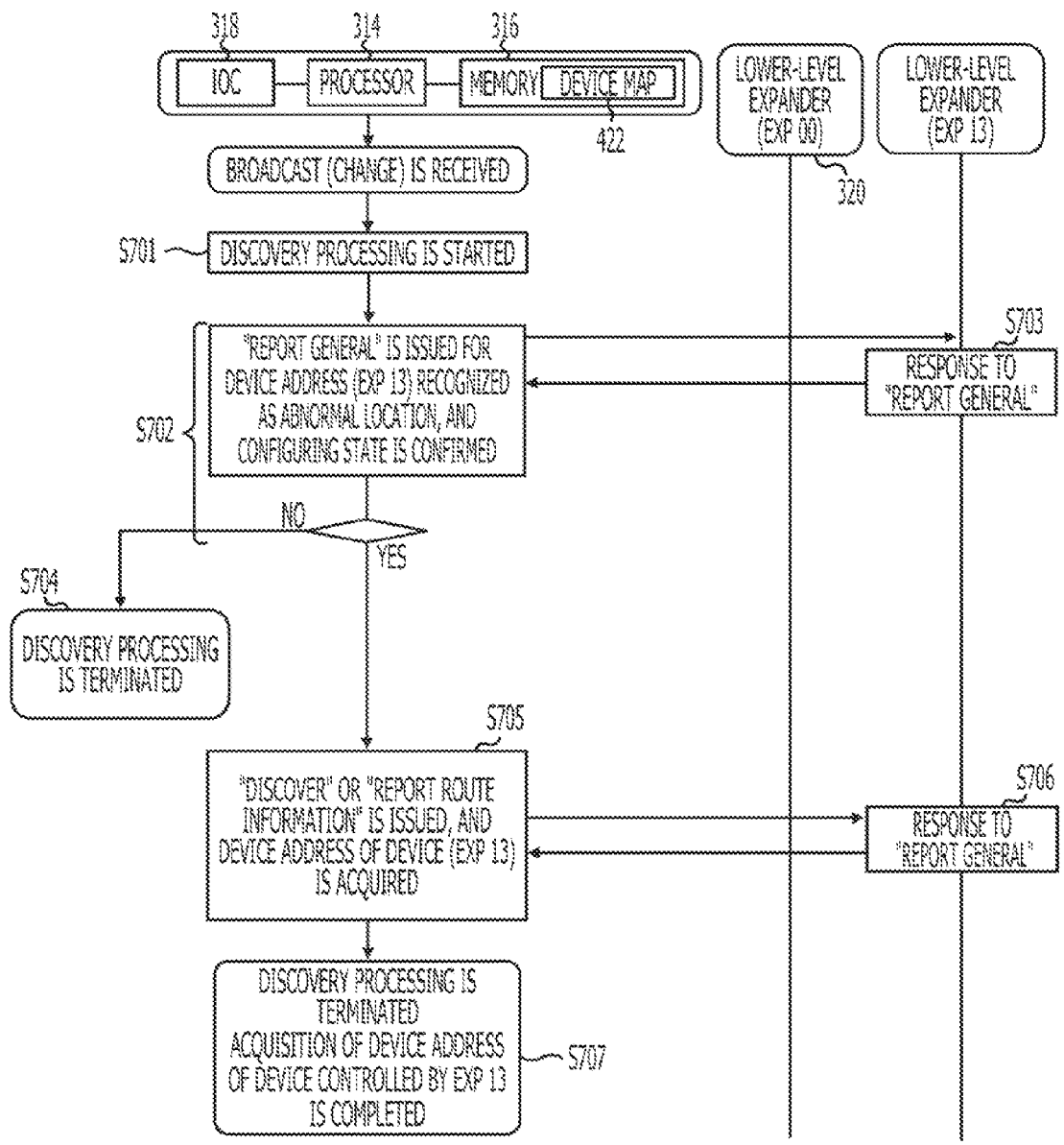
FIG. 20 is a flowchart illustrating an example of a processing procedure of Discovery processing after the completion of configuration confirmation.

The processing procedure of the partial Discovery will be described with reference to FIG. 20. FIG. 20 illustrates an example of the partial Discovery processing.

Also in the processing procedure of the partial Discovery, as illustrated in FIG. 20, the reception of Broadcast (Change) triggers Discovery processing to be started (S701), the command "Report General" is issued for a device address (EXP 13) recognized as an abnormal location, and it is confirmed whether or not the device is in a Configuring state (S702). In this case, the command "Report General" is issued for the EXP 13 that is a lower-level EXP, and the response to the "Report General" is received from the EXP 13 (S703).

The Configuring state is confirmed on the basis of the response to the "Report General" from the EXP 13 (S703), and if the device is not in the Configuring state (S702: NO), the processing shifts to normal Discovery processing (S704).

When the EXP 13 is in the Configuring state (S702: YES), the command "Discover" or the command "Report Route Information" is issued as already described, and the device address (EXP 13) is acquired (S705). In this case, the response to the command "Discover" or the command "Report Route Information" is received from the EXP 13 (S706).

If such a response to the command is received, Discovery processing is terminated, and the acquisition of a device address controlled by the EXP 13 is completed (S707).

A device map after such processing as described above will be described with reference to FIG. 21. FIG. 21 is a diagram illustrating an example of the device map after Discovery processing. In FIG. 21, the same symbol is assigned to the same portion as that in FIG. 19.

As illustrated in FIG. 21, after the Discovery processing is performed, available device addresses are stored in the device map 422 along with index numbers. A value "0" indicating invalidity is stored for an invalid device along with the index number.

Figure 22A:
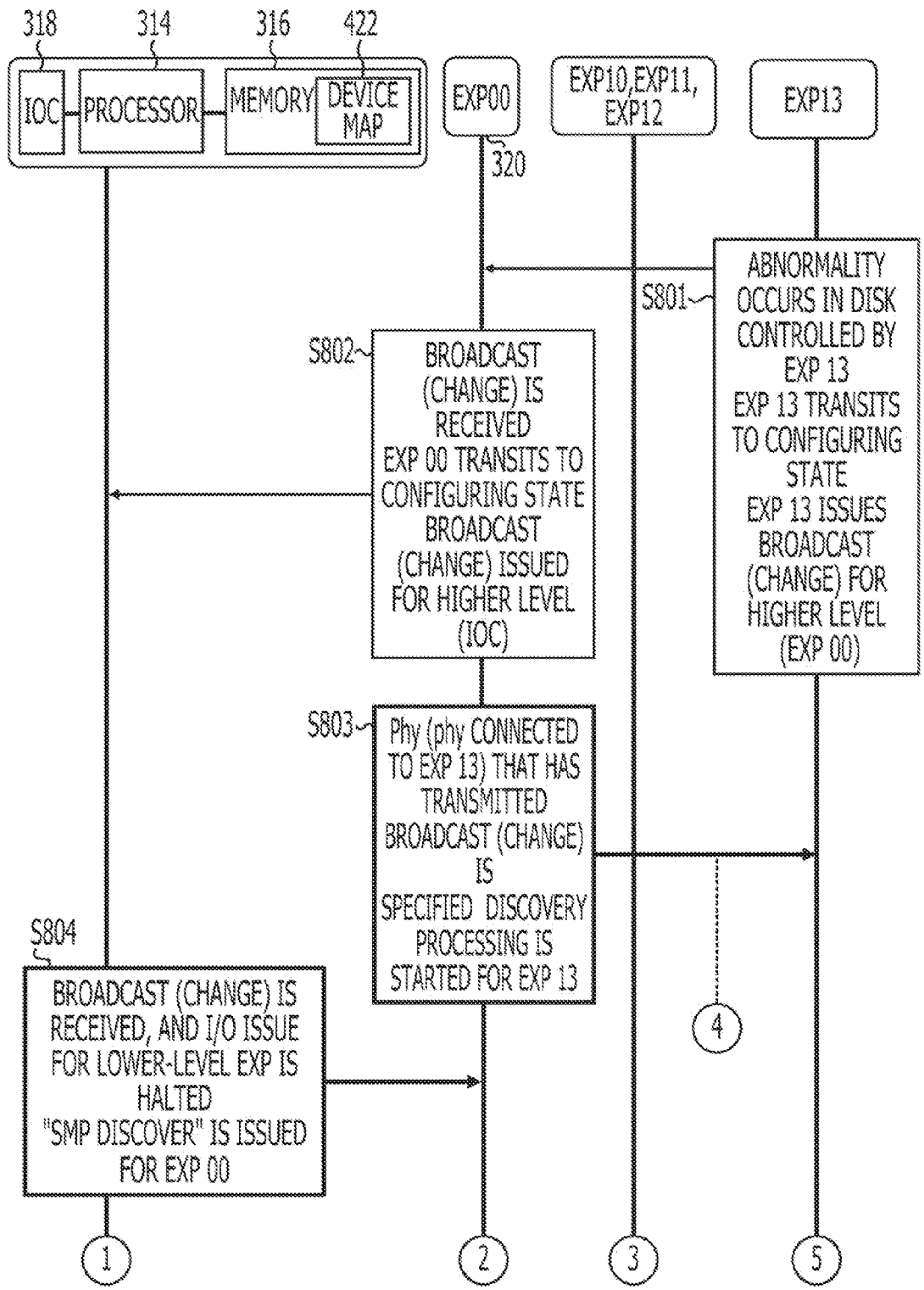
FIGS. 22A and 22B are a flowchart illustrating an example of all processing procedures of Discovery.
Figure 22B:
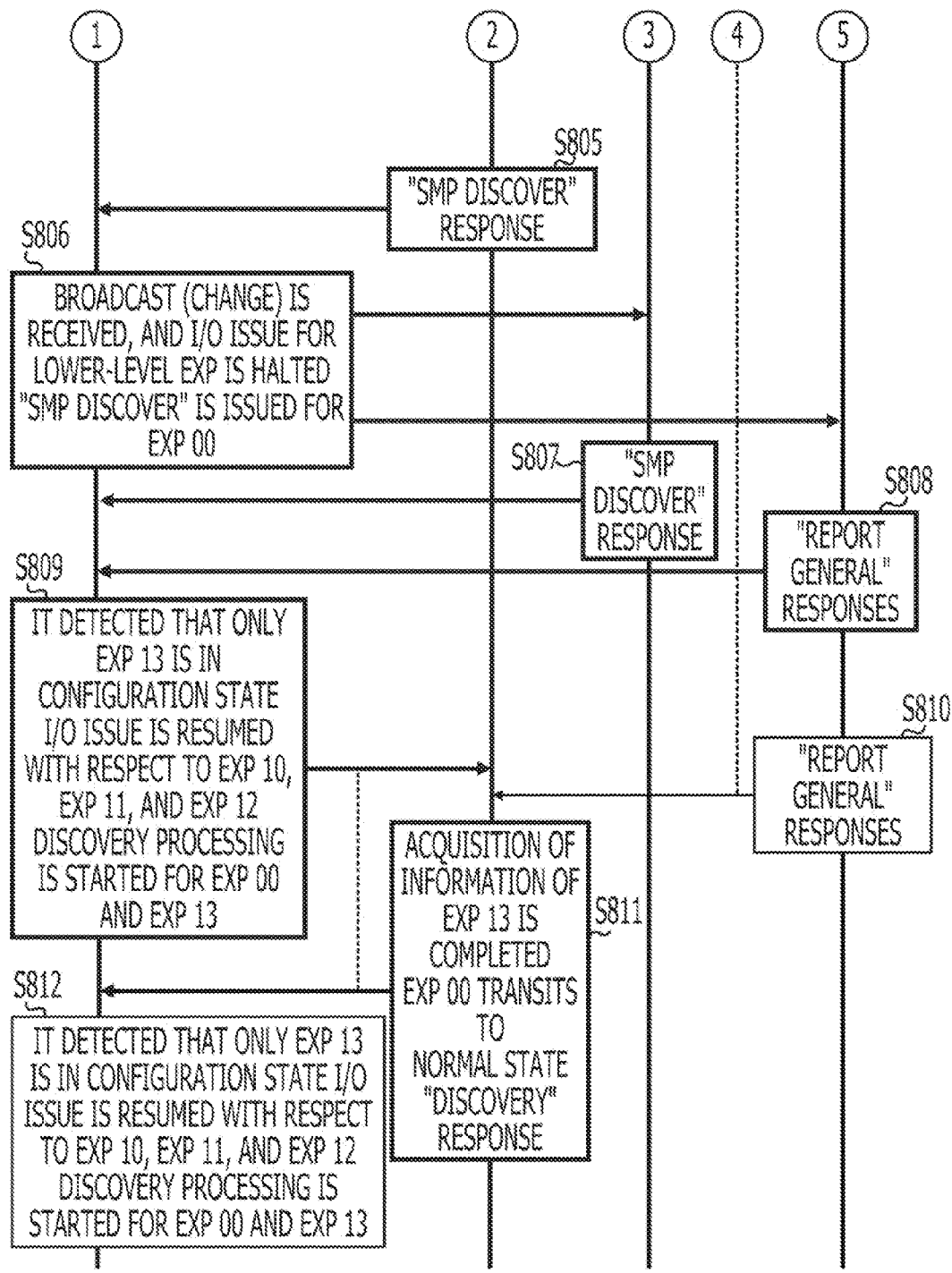

Next, a processing procedure to which the partial Discovery processing is applied will be described with reference to FIGS. 22A and 22B.

In this case, abnormality occurs in a device controlled by the EXP 13, and the EXP 13 transits to a Configuring state, and issues Broadcast (Change) for a higher-level EXP (EXP 00) (S801).

Therefore, the EXP 00 receives the Broadcast (Change) from the EXP 13, transits to a Configuring state, and issues Broadcast (Change) for the IOC 318 that is a higher-level device (S802).

At this time, the EXP 00 specifies a physical port that has transmitted the Broadcast (Change), namely, a physical port to which the EXP 13 is connected, and starts performing Discovery processing on the EXP 13 (S803). Namely, the partial Discovery processing is started.

The IOC 318 receives the Broadcast (Change) from the EXP 00, halts I/O issue for a lower-level EXP, and issues "SMP Discover" for the EXP 00 (S804). In response, the response to the "SMP Discover" is issued from the EXP 00 (S805), and is notified to the IOC.

The IOC issues "Report General", which is a command of the SMP, for acquired device addresses (EXP 10, EXP 11, EXP 12, and EXP 13) (S806), and notifies the EXP 10, the EXP 11, the EXP 12, and the EXP 13 of the "Report General".

In response to this, the responses to the "Report General" are issued from the EXP 10, the EXP 11, and the EXP 12 (S807), and in the same way, the response to the "Report General" is issued from the EXP 13 (S808).

Accordingly, the IOC detects that only the EXP 13 is in a Configuration state, and resumes I/O issue with respect to the EXP 10, the EXP 11, and the EXP 12, and starts performing Discovery processing on the EXP 00 and the EXP 13 (S809).

The EXP 13 is subjected to the Discovery processing from the EXP 00 (S803), completes the acquisition of the information of a device controlled by the EXP 13, and responds to "Discovery" after transiting to a normal state (S810).

In response to the completion of the information acquisition performed by the EXP 13, the EXP 00 transits to a normal state, and performs the response to "Discovery" for the IOC (S811).

In addition, in the IOC 318, after the acquisition of the information of a lower-level EXP is completed, I/O issue for the EXP 13 is resumed (S812).

As described above, according to the embodiment, a port to which an abnormal device belongs is targeted, device information belonging to the port is invalidated, and the device information of a port to which a normal device belongs is held. Therefore, input-output processing can be accelerated, and the usefulness of the multistage connection can be maintained and further improved.

In addition, only a port to which an abnormal device belongs is specified, a during-configuration-confirmation state for each port can be minimized, and hence a processing operation ranging from the confirmation processing to an input-output state can also be accelerated.

In addition, in the embodiment, since a device map is provided, and the device map is linked with a routing table, the device information is stored in the device map. Therefore, a CM side can give notice of optimum and latest device information in response to an inquiry from a higher-level device, namely, a host, thereby contributing to the reliability and acceleration of data processing. Namely, the embodiment can contribute to the construction of a more convenient storage system.

[Another Embodiment]

(1) While the SAS device is exemplified in the above-mentioned embodiments, the connection expansion device and the storage system of the present disclosure are not limited to the examples. Devices other than the SAS device may also be adopted.

(2) While, in the routing table 224 in the above-mentioned embodiment, physical port information is set in the row and the index information is set in the column, the routing table is not limited to the example. For example, as illustrated in FIG. 23, a routing table 448 may be formed in which an index information storage unit 442 is set in a row, a physical port information storage unit 444 is set in a column, and device address information is stored in an item field 446.

COMPARATIVE EXAMPLE

A comparative example is an example in which a processing procedure when the partial Discovery processing of the present disclosure is not performed is exemplified. In such a processing procedure, when an abnormal device is detected, all physical ports shift to during-configuration-confirmation states, and hence the acceleration of input-output processing is deteriorated. Since the already-described hardware can also be used in the comparative example, the same symbols as those in the above-mentioned embodiment are assigned.

Therefore, the recognition processing of the state change of a device will be described with reference to FIG. 24. FIG. 24 illustrates the processing procedure of the device recognition processing at the time of the state change.

The processing procedure is the device recognition processing performed in an IOC when, as a result of the occurrence of abnormality due to a device failure or a disconnection, the device state of a device controlled by an EXP changes.

1) The EXP 13 recognizes that the device 13F controlled by the EXP 13 has become abnormal (S901).

2) In accordance with the abnormality of the device controlled by the EXP 13, the EXP 13 is put into a Configuring state (S902). In Step S902, Broadcast (Change) is issued for the EXP 00, and the EXP 00 is notified that the EXP 13 has been put into a Configuring state. The EXP 00 receives the Broadcast (Change) through the Phy 3.

3) In response to the shift of the EXP 13 to the Configuring state, the EXP 00 is also put into a Configuring state (S903). As a result, it is difficult and/or impossible for the IOC to perform I/O issue for a device controlled by the EXP 00.

4) The device recognition processing for a device controlled by the EXP 13 is completed with respect to the EXP 13 (S904) (the termination of Configuring).

5) In response to the completion of the device recognition processing of the EXP 13, the EXP 00 issues "Discover" or "Report Route Information", which is the command of the SMP Function, for the EXP 13 (S905). In S905, the EXP 00 acquires device information (an SAS address and physical port information), and creates a routing table in the memory domain of the EXP 00 itself (S905).

6) After the completion of the acquisition of information from the EXP 13, the EXP 00 cancels the Configuring state of the EXP 00 itself (S906).

7) In response to the Configuring cancellation of the EXP 00, the IOC issues the SMP Function for the EXP 00 in the same way, and acquires device information (S907). After that, it may be possible to perform I/O issue for a device controlled by the EXP 00.

In this way, when the connection expansion control method of the present disclosure is not used, the EXP 00 also shifts to a Configuring state owing to a configuration change due to the device abnormality of a device controlled by the EXP 13. Therefore, the EXP 00 is put into a state in which it is also difficult and/or impossible to perform I/O issue for devices controlled by the EXP 10, the EXP 11, and the EXP 12, which are not intrinsically related to the device abnormality. As a result, as illustrated in FIG. 8, in an environment in which EXPs controlled by the EXPs 10 to 13 are multistage-connected to the EXPs 10 to 13, the influence also reaches devices controlled by the EXPs 20, 21, and 22. Therefore, although the devices are normal device, the number of unavailable devices is increased.

Therefore, even if, in such a situation as described above, namely, device abnormality occurs, the use of the connection expansion control method of the present disclosure allows to perform I/O issue for the devices controlled by the EXPs 10, 11, and 12.

Next, the Discovery processing of an EXP will be described with reference to FIGS. 25A and 25B. FIGS. 25A and 25B illustrate the processing procedure of the Discovery processing.

The Discovery processing is the procedure of the creation processing of a routing table, and includes response processing operations performed in a higher-level EXP and a lower-level EXP.

The Discovery processing is triggered substantially immediately after the Power On of the higher-level EXP or by the reception of Broadcast (Change). Therefore, substantially immediately after the Power On of the higher-level EXP, or in response to the reception of Broadcast (Change) (S1001), the higher-level EXP transits to a Configuring state, and discards a routing table (S1002).

At this point, the Discovery processing is started (S1003), and "Report General" is issued (S1004). The "Report General" is notified to the lower-level EXP, and the response to the "Report General" is issued from the lower-level EXP (S1005) and notified to the higher-level EXP.

The higher-level EXP that has received the response to the "Report General" determines, on the basis of the response to the "Report General", whether or not the lower-level EXP is in a Configuring state (S1006). If the lower-level EXP is in a Configuring state (S1006: YES), the higher-level EXP shifts to Discovery standby processing (S1014), and, after the processing, shifts to the start of the Discovery processing.

If the lower-level EXP is not in a Configuring state (S1006: NO), the higher-level EXP issues commands "Discover" that are as many as the number of the physical port numbers ("NUMBER OF PHYS") in the response to the "Report General", and acquires the device address of a device directly connected to the lower-level EXP (S1007). Namely, when issuing "Discover", the higher-level EXP notifies the lower-level EXP of the "Discover", and receives the response to the "Discover" (S1008 and S1009). Such a processing as described above is executed as many times as the number of the physical port numbers.

After the acquisition of the device address (S1007), the higher-level EXP issues "Report Route Information", and acquires the device address of a device connected to the even lower side of the lower-level EXP (S1010). In the process of the processing, the notification of "Report Route Information" to the lower-level EXP and the response to the "Report Route Information" are received (S1011).

After the above-mentioned processing, the higher-level EXP terminates the Discovery processing (S1012), creates a routing table on the basis of the acquired address, and transits from the Configuring state to a normal state (S1013).

Figure 26:
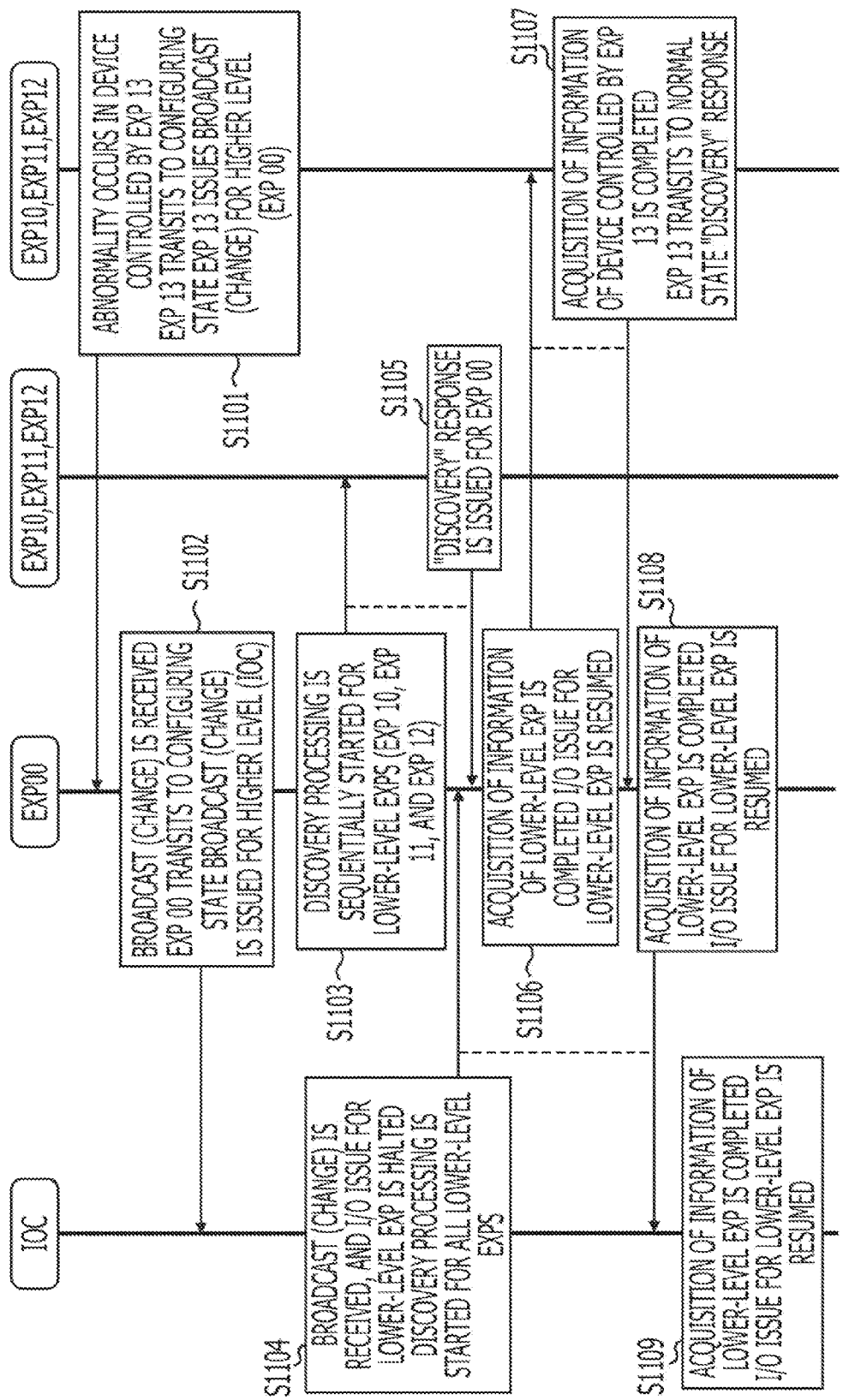
FIG. 26 is a flowchart illustrating a comparative example of all processing procedures of Discovery.

Next, a processing procedure to which no partial Discovery processing is applied will be described with reference to FIG. 26.

In this case, in the EXP 13, abnormality occurs in a device controlled by the EXP 13, and the EXP 13 transits to a Configuring state, and issues Broadcast (Change) for a higher-level EXP (EXP 00) (S1101).

Therefore, the EXP 00 receives the Broadcast (Change) from the EXP 13, transits to a Configuring state, and issues Broadcast (Change) for the IOC that is a higher-level device (S1102).

At this time, the EXP 00 sequentially starts Discovery processing for the EXP 10, the EXP 11, and the EXP 12 that are lower-level EXPs (S1103).

The IOC receives the Broadcast (Change), halts I/O issue for the lower-level EXPs, and starts Discovery processing for all lower-level EXPs (S1104).

The EXP 10, the EXP 11, and the EXP 12 respond to the "Discovery" in accordance with an instruction from the EXP 00 (S1105).

The EXP 00 starts the Discovery processing for the lower-level EXP (EXP 13) (S1106). In response to this, if the acquisition of the information of a device controlled by the EXP 13 is completed, the EXP 13 transits to a normal state, and respond to the "Discovery" (S1107).

If the acquisition of the information of the lower-level EXP is completed, the EXP 00 that has received the response transits to a normal state, and respond to the "Discovery" from the IOC (S1108).

In addition, after the acquisition of the information of the lower-level EXP is completed, the IOC resumes I/O issue for the lower-level EXP (S1109).

In this way, in the comparative example, if device abnormality occurs in one physical port, all physical ports shift to during-configuration-confirmation states, and all physical ports are put into a state in which it is difficult and/or impossible to perform input-output processing, until all Discovery processing operations are completed. Even if a multistage configuration in which an EXP is used is adopted, it is difficult to make the use of the merits of the multistage configuration when a during-configuration-confirmation state is continued. Such a problem as described above can be addressed in accordance with the above-mentioned embodiments. When device abnormality is detected, a physical port to which an abnormal device belongs is targeted, and input-output processing performed in a physical port to which a normal device belongs is secured, thereby being contributing to acceleration of processing.

Next, with respect to an embodiment including the above-mentioned embodiments, the following additional statement will be disclosed. The present invention is not restricted to the following additional statement.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Although the embodiments of the present inventions have been described in detail, it should be understood that the various changes, substitutions, and alterations could be made hereto without departing from the spirit and scope of the invention.

The invention claimed is:

1. A storage system for storing data, comprising:
an input-output control including a first storage unit;
a connection expansion unit including a plurality of ports to which devices are connected and a second storage unit that stores a routing table that associates device information for each device and the port to which each device is connected, the connection expansion unit configured to
specify, based on the device information, a port to which an abnormal device is connected,
invalidate the port to which the abnormal device is connected by removing all the device information for each device connected to the port,
instruct the first storage unit to store the removed device information,
execute confirmation processing for the port to which the abnormal device is connected, and
execute, during the execution of the confirmation processing for the port to which the abnormal device is connected, input-output processing for a port to which a normal device is connected.

2. The storage system according to claim 1, wherein the input-output control unit outputs the device information existing in the first storage unit in response to an inquiry from a higher-level-side device for device information.

3. A control method for a storage system, the method comprising:
storing, in a first storage unit, a routing table that associates device information for each device connected to a connection expansion device via a plurality of ports and the port to which each device is connected;
specifying, based on device information, a port to which an abnormal device is connected;
invalidating the port to which the abnormal device is connected by removing, from the first storage unit, all the device information for each device connected to the port;
instructing a second storage unit to store the removed device information;
executing confirmation processing for the port to which the abnormal device is connected; and
executing, during the execution of the confirmation processing for the port to which the abnormal device is connected, input-output processing for a port to which a normal device is connected.

* * * * *